US012667902B2

(12) United States Patent
Ravet et al.

(10) Patent No.: US 12,667,902 B2
(45) Date of Patent: Jun. 30, 2026

(54) ELECTRODE ASSEMBLY FOR ARC WELDING

(71) Applicant: Lincoln Global, Inc., Santa Fe Springs, CA (US)

(72) Inventors: Romain Ravet, Parthenay (FR); Yann Levillain, Cauverville-en-Roumois (FR); Yann Rivet, Grand-Couronne (FR); Laurent Longinotti, Les Ageux (FR); Loic Verwaerde, Saint Aubin Epinay (FR); Telmo Agostinho, Conflans Sainte Honorine (FR); Dirk Haupt, Hofheim am Taunus (DE); Christoph Vollet, Ebertsheim (DE); Jerome Cantet, Neuvy-Bouin (FR); Michel Jany, Mount Saint Aignan (FR); Christopher Thume, Iserlohn (DE); Frank Bolte, Essen (DE); Roland Pollmann, Velbert (DE); Bryan M. O'Neil, Double Oak, TX (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 851 days.

(21) Appl. No.: 18/057,002

(22) Filed: Nov. 18, 2022

(65) Prior Publication Data

US 2023/0158598 A1     May 25, 2023

Related U.S. Application Data

(60) Provisional application No. 63/370,430, filed on Aug. 4, 2022, provisional application No. 63/264,358, filed on Nov. 19, 2021.

(51) Int. Cl.
B23K 9/12          (2006.01)
B23K 9/02          (2006.01)
(Continued)

(52) U.S. Cl.
CPC ............ B23K 9/122 (2013.01); B23K 9/0213 (2013.01); B23K 9/1093 (2013.01); B23K 9/186 (2013.01); *B23K 9/1006* (2013.01)

(58) Field of Classification Search
CPC ........ B23K 9/122; B23K 9/186; B23K 9/188; B23K 9/0213; B23K 9/1006; B23K 9/1093; B23K 9/26; B23K 9/282
See application file for complete search history.

(56) References Cited

U.S. PATENT DOCUMENTS 2,721,249 A     10/1955  Landis et al.
2,965,746 A     12/1960  Cresswell
(Continued)

FOREIGN PATENT DOCUMENTS

CN          105195871 A     12/2015
DE            4128516 A1     3/1993
(Continued)

OTHER PUBLICATIONS

Naver Korean—English Dictionary, "minute," 2005.
(Continued)

*Primary Examiner* — Brian W Jennison
(74) *Attorney, Agent, or Firm* — Knobbe Martens; Ivan P. Gracic

(57)          ABSTRACT

The disclosed technology relates generally to welding technologies and more particularly to electrode assemblies for arc welding, e.g., submerged arc welding. In one aspect, an electrode assembly for submerged arc welding (SAW) comprises a head portion and an extension portion that are arranged serially to feed a consumable electrode therethrough such that, during SAW, the head portion is disposed to be distal to an arcing tip of the consumable electrode and the extension portion is disposed to be proximal to the arcing tip of the consumable electrode. The head portion includes
(Continued)

a contact tip configured to electrically contact the consumable electrode to deliver power thereto. The extension portion is formed of a single piece insulating article configured for the consumable electrode to finally pass through before the arcing tip is exposed.

21 Claims, 13 Drawing Sheets

(51) Int. Cl.
B23K 9/10          (2006.01)
B23K 9/18          (2006.01)

(56)                    References Cited

U.S. PATENT DOCUMENTS

| | | | |
|---|---|---|---|
| 3,089,022 | A | 5/1963 | Kinney |
| 3,469,070 | A | 9/1969 | Bernard et al. |
| 4,246,463 | A | 1/1981 | Shutt et al. |
| 4,529,863 | A | 7/1985 | Lebel |
| 5,635,091 | A | 6/1997 | Katsuyoshi |
| 5,958,261 | A | 9/1999 | Offer et al. |
| 6,127,651 | A * | 10/2000 | Burgoon ............... B23K 9/167 |
| | | | 219/137 R |
| 6,271,495 | B1 * | 8/2001 | Rooney ............... B23K 9/0213 |
| | | | 219/136 |
| 10,189,108 | B2 * | 1/2019 | Radke ................... B23K 9/287 |
| 2004/0079741 | A1 | 4/2004 | Keegan |
| 2006/0151453 | A1 | 7/2006 | Gordon et al. |
| 2007/0056945 | A1 | 3/2007 | Hammen |
| 2017/0036294 | A1 * | 2/2017 | Radke ..................... B23K 9/26 |
| 2018/0009052 | A1 | 1/2018 | Struksnes et al. |
| 2023/0158596 | A1 | 5/2023 | Ravet et al. |
| 2023/0158597 | A1 | 5/2023 | Ravet et al. |

FOREIGN PATENT DOCUMENTS

| | | |
|---|---|---|
| DE | 20 2016 004798 | 11/2016 |
| EP | 2823927 A1 | 1/2015 |
| GB | 714901 | 9/1954 |
| GB | 898583 A | 6/1962 |
| GB | 1480332 A | 7/1977 |
| JP | 2542628 Y2 | 7/1997 |
| KR | 20090099128 A | 9/2009 |
| KR | 20100005059 U | 5/2010 |
| WO | WO 98/12011 A1 | 3/1998 |
| WO | WO 03/039800 A1 | 5/2003 |

OTHER PUBLICATIONS

International Search Report and Written Opinion for International Application No. PCT/US2022/050396, mailed Apr. 4, 2023 in 14 pages.
International Search Report and Written Opinion for International Application No. PCT/US2022/050386, mailed Mar. 2, 2023 in 12 pages.
"Gas Metal and Flux Cored Arc Welding", Goodheart-Wilcox Co. Inc., Modern Welding, 12th Edition, p. 219.
Thulani Mngomezulu, "Optimising SAW deposition rates using Long Stick Out", African Fusion, Jun. 2017, 1 page.
Submerged Arc Welding, ESAB, XA00109620, www.esab.com, Feb. 10, 2018, in 42 pages.
"The Full Solution for Submerged Arc Welding" www.lincolnelectric. eu, brochure in 20 pages.
"Hexoloy SE Silicon Carbide", Saint-Gobain Ceramics, 2012, in 2 pages.
Saint-Gobain Performance Ceramics & Refractories, Ceramic Tubes & Crushable Insulators for Thermocouples & Gas Sensors, 2021, in 12 pages.
Keramische Werkstoffe, Ceramic Materials, "Advanced Ceramics for Mechanical Engineering", www.ceramtec.com, in 4 pages.
"Electrical Resistivity of Hexoloy SA Silicon Carbide", Saint-Gobain Ceramics, 2003, 1 page.
"Heat Shrinking of Hexoloy Silicon Carbide", Saint-Gobain Ceramics, 2003, in 2 pages.
International Search Report and Written Opinion for International Application No. PCT/US2022/050387, mailed Mar. 2, 2023 in 16 pages.

* cited by examiner

300B

304B

306B

320B

303

310B

316B

308B

302

300A

304A

306A

303

320A

310A

316A

308A

302

ELECTRODE ASSEMBLY FOR ARC WELDING

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims the benefit under 35 U.S.C. § 119(e) to U.S. Provisional Patent Application No. 63/264, 358, entitled ELECTRODE ASSEMBLY FOR ARC WELDING, filed Nov. 19, 2021, and to U.S. Provisional Patent Application No. 63/370,430, entitled ELECTRODE ASSEMBLY FOR ARC WELDING, filed Aug. 4, 2022. The entirety of each of the above applications is hereby incorporated by reference herein.

BACKGROUND

Field

The disclosed technology generally relates to welding technologies and more particularly to electrode assemblies for arc welding, e.g., submerged arc welding.

Description of the Related Art

Various welding technologies utilize welding wires that serves as a source of metal. For example, in metal arc welding, an electric arc is created when a voltage is applied between a consumable weld electrode wire, which serves as one electrode that advances towards a workpiece, and the workpiece, which serves as another electrode. The arc melts a tip of the metal wire, thereby producing droplets of the molten metal wire that deposit onto the workpiece to form a weldment or weld bead.

Technological and economic demands on welding technologies continue to grow in complexity. For example, the need for higher bead quality in both appearance and in mechanical properties continues to grow, including high yield strength, ductility and fracture toughness. Simultaneously, the higher bead quality is often demanded while maintaining economic feasibility. Some welding technologies aim to address these competing demands by improving the consumables, e.g. by improving the physical designs and/or compositions of the electrode wires.

Submerged arc welding (SAW) can provide highly economic solutions for some applications. The high deposition rates attained with submerged arc are chiefly responsible for the economies achieved with the process.

SUMMARY OF THE INVENTION

In an aspect, an electrode assembly for submerged arc welding (SAW) comprises a head portion and an extension portion that are arranged serially to feed a consumable electrode therethrough such that, during SAW, the head portion is disposed to be distal to an arcing tip of the consumable electrode and the extension portion is disposed to be proximal to the arcing tip of the consumable electrode. The head portion includes a contact tip configured to electrically contact the consumable electrode to deliver power thereto. The extension portion is formed of a single piece insulating article configured for the consumable electrode to finally pass through after passing through the contact tip and before the arcing tip is exposed.

In another aspect, an electrode assembly for submerged arc welding, comprising a head portion and an extension portion arranged serially with the head portion in a wire feed direction. The head portion includes a contact tip configured to electrically contact a consumable electrode to deliver power thereto. The head portion and the extension portion are configured to feed a consumable electrode therethrough. The extension portion is configured to be disposed to be proximal to an arcing tip of the consumable electrode relative to the head portion, and the extension portion is formed of a single piece insulating article arranged to be serial to the contact tip.

In another aspect, an extension portion that is configured for a submerged arc welding electrode assembly comprises a single piece insulating article formed of a ceramic material having a length greater than 80 mm and configured to surround a consumable electrode. The extension portion is configured to be arranged serially to a contact tip of a head portion of the submerged arc welding electrode assembly.

DETAILED DESCRIPTION

In processes using a consumable electrode, the electrode or the wire melts to provide an additive metal that fills a gap to form a weld joint that joins two metal workpieces. The welding processes using consumable electrodes include shielded metal arc welding (SMAW), gas metal arc welding (GMAW) or metal inert gas (MIG) welding, flux-cored arc welding (FCAW), metal-cored arc welding (MCAW), and submerged arc welding (SAW), among others.

Submerged Arc Welding

Figure 1:
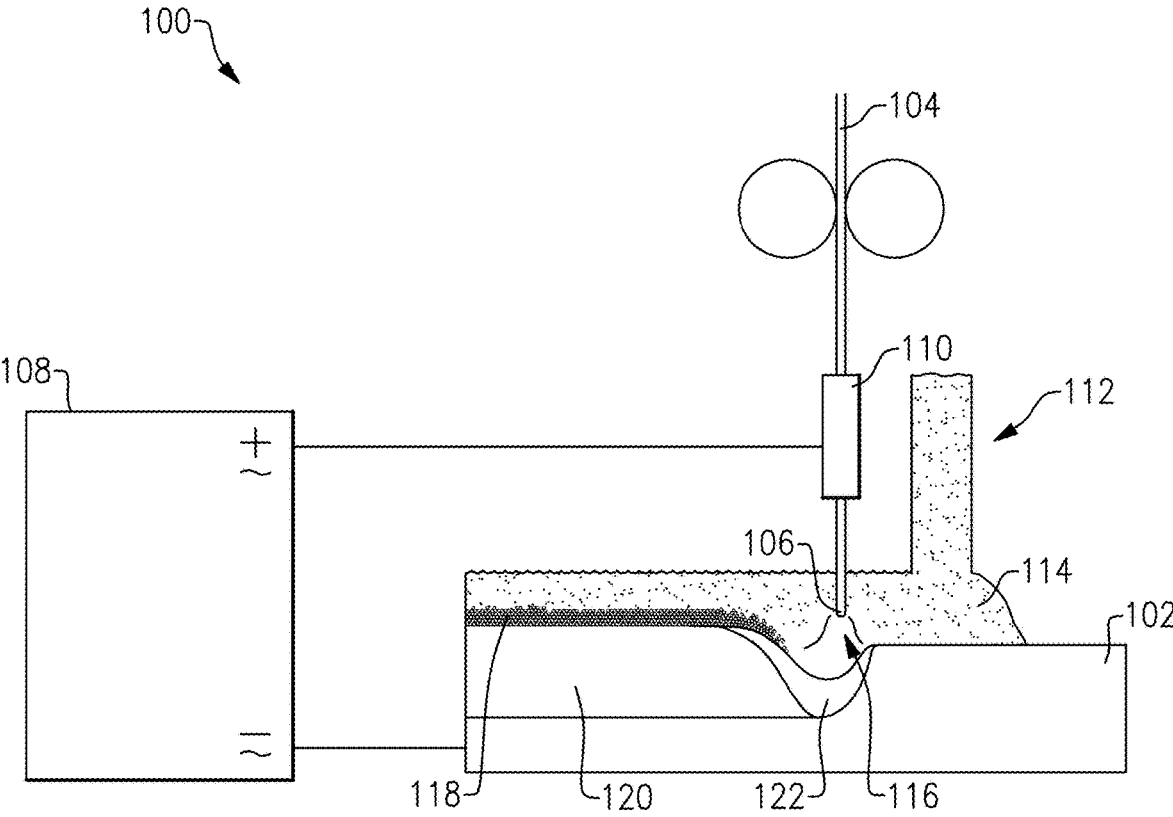
FIG. 1 schematically illustrates a submerged arc welding (SAW) system according to embodiments of the present technology.

FIG. 1 schematically illustrates a submerged arc welding (SAW) system 100 for depositing a filler or weld metal onto a workpiece 102. The system 100 includes a bare metal electrode wire 104 having a tip 106, a contact tip 110 coupled to the electrode 104, and a power supply 108, which is electrically coupled to the contact tip 110 and the workpiece 102. The system 100 also includes a flux delivery system 112, which is configured to dispense flux 114 onto the workpiece 102 during the SAW process. The electrode 104 generally comprises a metal or alloy while the flux comprises granular fusible material. During the SAW process, heat is derived from an arc 116 between a bare metal electrode 104 and a workpiece 102. The arc is shielded by a blanket of the flux 114 which is placed over the joint area ahead of the arc 116. Filler metal is obtained primarily from the electrode wire 104 which is continuously fed through the blanket of flux 114 into the arc 116 and pool 122 of molten flux. Additional filler metal may be obtained by adding cold wire to the weld pool 122 or from metal powder contained in the flux 114. Accordingly, in SAW, unlike the other fluxed processes, two consumables (the electrode wire 104 and the flux 114) are used and these two consumables may be supplied separately.

The distinguishing feature of SAW is the flux 114, which covers the weld area and prevents arc radiation, sparks, spatter and fumes from escaping. The flux 114 allows for achieving high deposition rates and high-quality weld deposit characteristics. In addition to shielding the arc 116 from view, the flux 114 provides a slag 118 which protects the weld metal 120 as it cools, deoxidizes and refines the weld metal 120, insulates the weld to reduce the cooling rate and helps shape the weld contour.

During the SAW process, the heat of the arc 116 melts some of the flux 114 along with the tip 106 of the electrode 104 to form a weld pool 122, as illustrated in FIG. 1. The tip 106 of the electrode 104 and the welding zone are always surrounded and shielded by molten flux 114, which is itself covered by a layer of unfused flux 114. The electrode 104 is held a short distance above the workpiece 102 with the arc 116 forming between the electrode 104 and the workpiece 102. As the electrode 104 progresses along the joint, the lighter molten flux 114 rises above the molten metal in the weld pool 122 as slag. The weld metal which has a higher melting (freezing) point, solidifies while the slag above it is still molten. The slag then freezes over the newly solidified weld metal, continuing to protect the metal from contamination while it is very hot and would react with atmospheric oxygen and nitrogen. After cooling and removing any unfused flux for reuse, the solidified slag 118 may be easily removed from the weld.

The power supply 108 generates a voltage and current for the system 100 and the voltage and current are applied to the workpiece 102 and the electrode 104. The current is applied to the electrode via the contact tip 110. High currents can be used in submerged arc welding and extremely high heat can be generated. Because the current is applied to the electrode 104 a short distance above its tip 106, relatively high amperages can be used on small diameter electrodes. This results in extremely high current densities on relatively small cross sections of electrode. Currents as high as or exceeding 600 amperes can be carried on electrodes as small as 64", giving a density in the order of 100,000 amperes per square inch six to ten times that carried on stick electrodes.

Because of the high current density, the melt off rate is much higher for a given electrode diameter than with stick-electrode welding. The melt-off rate is affected by the electrode material, the flux 114, type of current, polarity, and length of wire beyond the point of electrical contact in the gun or head.

Submerged arc welding may be performed with either DC or AC power. Direct current gives better control of bead shape, penetration, and welding speed, and starting is relatively easier. Bead shape is usually best with DC electrode positive (DCEP or reverse polarity), which also provides maximum penetration. Highest deposition rates and minimum penetration can be obtained with DC electrode negative (DCEN). Alternating current minimizes arc blow and gives penetration between that of DCEP and DCEN.

The insulating blanket of flux 114 above the arc 116 prevents rapid escape of heat and concentrates it in the welding zone. Not only are the electrode 104 and base metal of the workpiece 102 melted rapidly, but the fusion is deep into the base metal. The deep penetration allows the use of small welding grooves, thus minimizing the amount of filler metal per foot of joint and permitting fast welding speeds. Fast welding, in turn, minimizes the total heat input into the assembly and, thus minimizes problems of heat distortion. Even relatively thick joints can be welded in one pass by submerged arc welding.

Welds made under the protective layer of flux 114 have good ductility and impact resistance and uniformity in bead appearance. Mechanical properties at least equal to those of the base metal are consistently obtained. In single-pass welds, the fused base material is large compared to the amount of filler metal used. Thus, in such welds the base metal may greatly influence the chemical and mechanical properties of the weld. For this reason, it is sometimes unnecessary to use electrodes of the same composition as the base metal for welding many of the low-alloy steels. However, the chemical composition and properties of multipass welds are less affected by the base metal and depend to a greater extent on the composition of the electrode, the activity of the flux, and the welding conditions.

Through regulation of current, voltage, and travel speed, the operator can exercise close control over penetration to provide any depth ranging from deep and narrow with high-crown reinforcement, to wide, nearly flat beads with shallow penetration. Beads with deep penetration may contain on the order of 70% melted base metal, while shallow beads may contain as little as 10% base metal. In some instances, the deep-penetration properties of submerged arc welding can be used to eliminate or reduce the expense of edge preparation.

The flux serves several functions in submerged arc welding. These include covering the molten weld metal to protect it from the atmosphere and acting as a slag which refines the molten deposit by scavenging oxides and other non-metallic inclusions. Metallic additions to the flux can add to the alloy content of the deposit and deoxidize it.

There are four types of fluxes based on their method of manufacture; fused, bonded, agglomerated and mechanically mixed.

Fluxes are also identified as basic, acid, and neutral. Basic fluxes contain oxides of metals which dissociate easily while acidic fluxes contain oxides which dissociate to a small extent. A neutral flux does not add or subtract from the composition of the weld deposit. Fluxes having a ratio of CaO or MnO to $SiO_2$ which is greater than one are considered basic, those near one are considered neutral, and those less than one are acidic.

With proper selection of equipment, submerged arc is widely applicable to the welding requirements of industry. It can be used with all types of joints, and permits welding a full range of carbon and low alloy steels, from 16-gauge sheet to the thickest plate. It is also applicable to some high-alloy, heat-treated, and stainless steels, and is a favored process for rebuilding and hard surfacing. Any degree of mechanization can be used—from the hand-held semi-automatic gun to boom or track-carried and fixture held multiple welding heads.

The high quality of submerged arc welds, the high deposition rates, the deep penetration, the adaptability of the process to full mechanization, and the comfort characteristics (no glare, sparks, spatter, smoke, or excessive heat radiation) make it a preferred process in steel fabrication. It is used extensively in ship and barge building, railroad car building, pipe manufacture, and in fabricating structural beams, girders, and columns where long welds are required. Automatic submerged arc installations are also key features of the welding areas of plants turning out mass-produced assemblies joined with repetitive short welds.

Other factors than deposition rates enter into the lowering of welding costs. Continuous electrode feed from coils, ranging in weight from 60 to 1,000 pounds, contributes to a high operating factor. Where the deep-penetration characteristics of the process permit the elimination or reduction of joint preparation, expense is reduced. After the weld has been run, cleaning costs are minimized, because of the elimination of spatter by the protective flux.

When submerged-arc equipment is used properly, the weld beads are smooth and uniform, so that grinding or machining are rarely required. Since the rapid heat input of the process minimizes distortion, the costs for straightening finished assemblies are reduced, especially if a carefully planned welding sequence has been followed. Submerged arc welding, in fact, often allows the pre-machining of parts, further adding to fabrication cost savings.

Because of these and other advantages provided by SAW, there is a desire and need to further improve various aspects of SAW, including even higher productivity and weld quality. For example, as one of the technical advantages of SAW derives from preheating the consumable electrode, there is a desire and need to further improve the preheating arrangement through improved electrode assembly design.

Long Stick-Out Electrode Assembly for Submerged Arc Welding

Figure 2:
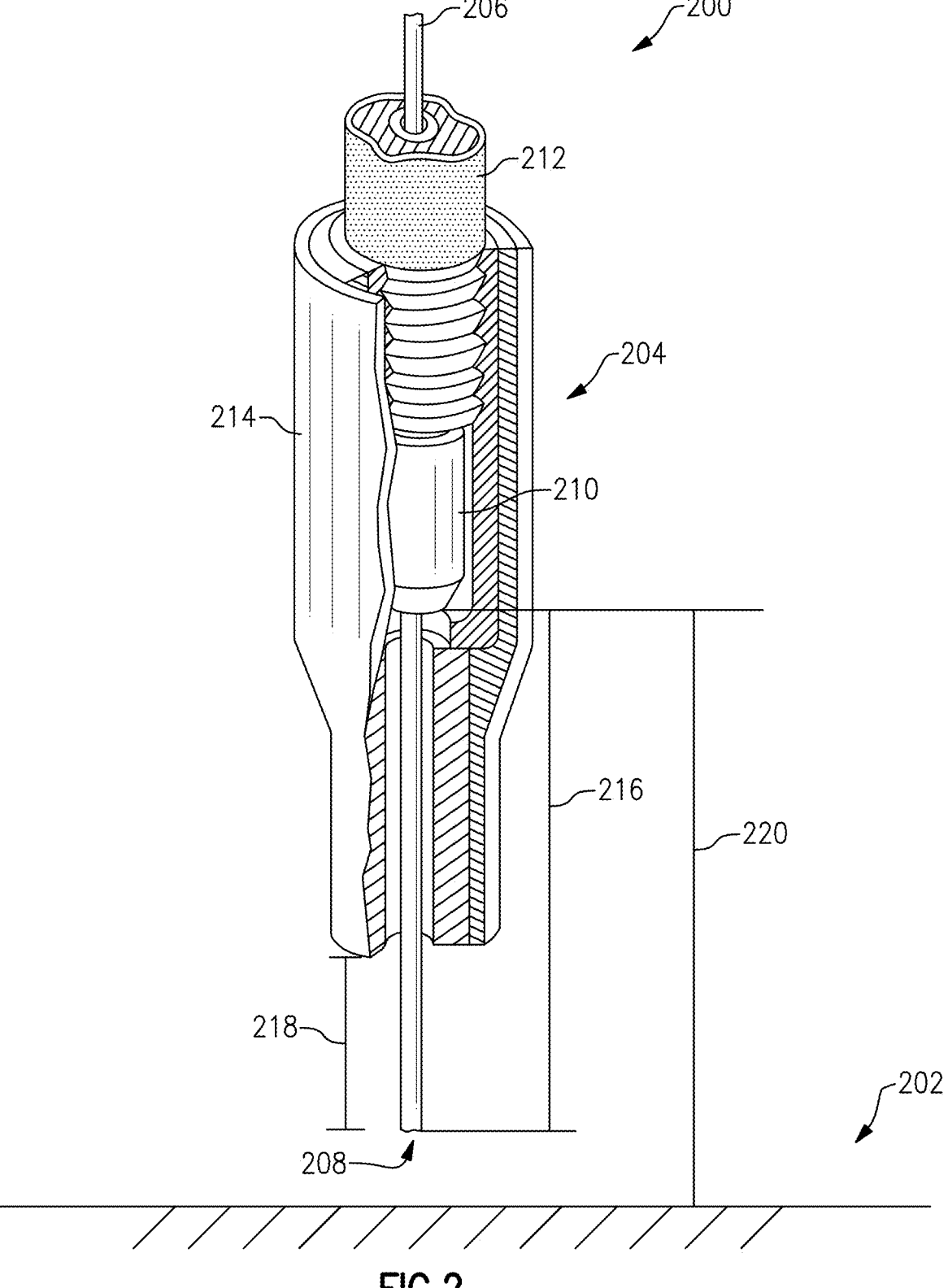
FIG. 2 illustrates a conventional electrode assembly for a SAW system.

FIG. 2 illustrates an electrode assembly 200 defining an electrical stick-out and positioned over a workpiece 202. The electrode assembly 200 includes a head portion 204 configured to receive a consumable electrode 206. The head portion 204 includes a contact tip 210, an electrode guide tube 212, and an insulated guide 214. The contact tip 210 is disposed radially around the electrode 210 and is configured to transfer current from a power source (e.g., power source 108 shown in FIG. 1) to the electrode 206. The electrode 206 includes a tip portion 208 configured to extend beyond the head portion 204. The portion of the electrode 206 that extends between the end portion 208 and the end of the head portion 204 is referred to as the visible stick-out 218 while the portion of the electrode 206 that extends between the tip portion 208 and the contact tip 210 is referred to as the electrical stick-out or electrical electrode extension 216. Unless stated otherwise, a stick-out length as used herein refers to the length of the electrical stick-out 216, which is the parameter predominantly affecting the electrical response of the electrode assembly 200. During operation of the electrode assembly 200, the tip portion 208 is positioned adjacent to the workpiece 202 and the distance between the contact tip 210 and the workpiece 202 is referred to as the contact tip to work distance (CTWD) 220.

The electrical stick-out 216 of the electrode wire 206 is preheated by Joule heating. If the electrical stick-out 216 is not sufficiently long, the electrode wire 206 may not be sufficiently preheated. On the other hand, an increase of the length of the electrical stick-out 216 increases the electrical resistance of the circuit, which in turn increases the heating and hence the temperature of the tip 208 of the electrode 206, leading to increased melting and deposition rate. The length of the electrical stick-out 216 in turn controls the dimensions of the weld bead since the length of the filler wire extension affects the burn-off rate. Further, electrical stick-out 216 exerts an influence on penetration through its effect on the welding current. As the length of the electrical stick-out 216 is increased, the preheating of and the voltage drop across the electrode wire 206 increases. The greater voltage drop can result in the bead shape being more convex, which can be overcome by increasing the voltage by 2-5 volts. The length of the electrical stick-out 216 distance can be approximately 3-10 times a diameter of the electrode 206 depending on the type of steel being welded, for traditional steel welding processes.

Figure 3B:
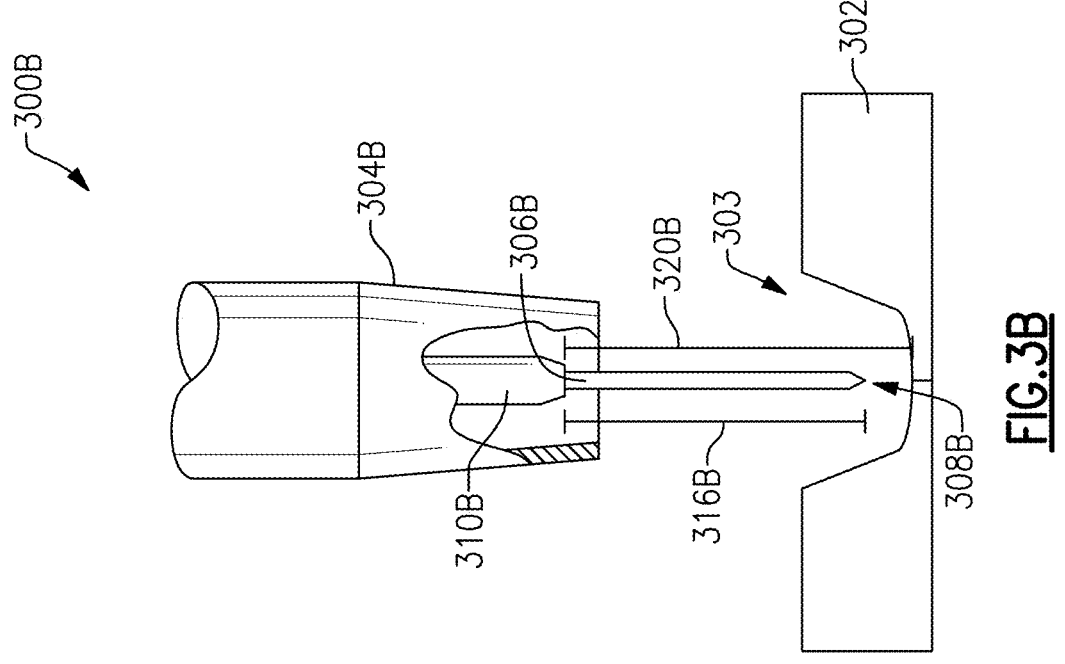
FIG. 3B illustrates a long stick-out (LSO) electrode assembly for a SAW system over a workpiece having a shallow groove.
Figure 3A:
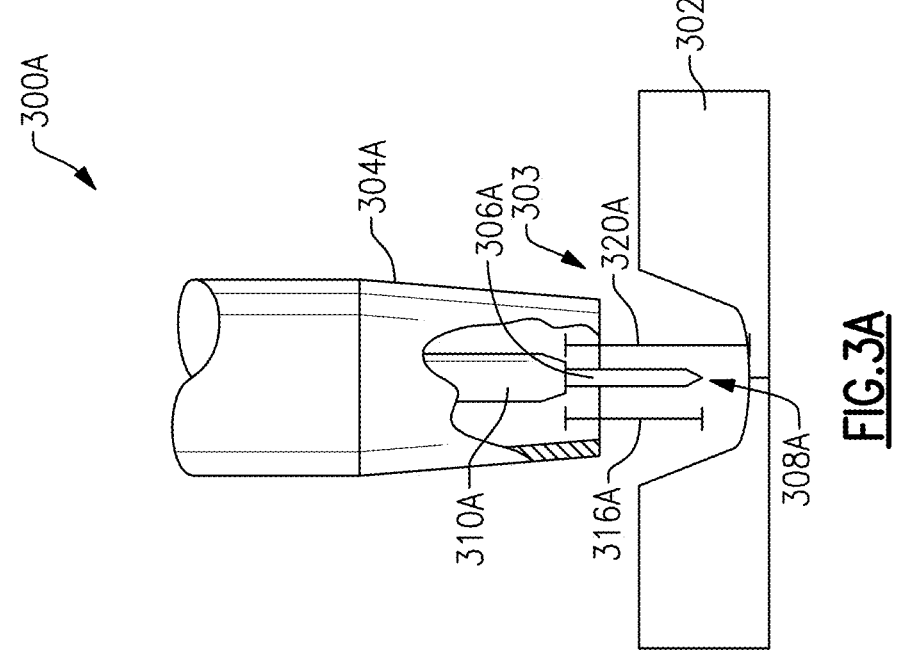
FIG. 3A illustrates a conventional electrode assembly for a SAW system over a workpiece having a shallow groove.

FIG. 3A depicts an electrode assembly 300A positioned over a workpiece 302 having a groove 303. In the illustrated configuration, the stick-out portion 316A of the electrode 306A extends a conventional distance beyond the contact tip 310A (e.g., 3 to 12 times the diameter of the electrode). The electrode assembly 300A is positioned such that the head portion 304A is positioned over the groove 303 and the tip 308A of the electrode 308A is within the groove 303. More specifically, the head portion 304A is positioned such that the tip 308A is adjacent to the bottom of the groove 303 without the head portion 304A contacting the workpiece 302. In the illustrated embodiment, the tip 308A is positioned within the groove such that the CTWD 320A is about 25 mm. Positioning the tip 308A closely adjacent to the bottom of the groove 303 allows for better and more consistent arcing between the tip 308A and the workpiece 302, thereby resulting in a more consistent deposition of filler metal into the groove 303 and improved weld quality and efficiency.

To further improve upon submerged arc welding (SAW) technology, a long stick-out (LSO) or extended stick-out technology developed by Lincoln Electric company may be employed. Long stick-out SAW refers to SAW processes in which the length of the wire that sticks out ("stick-out length") of the electrode contact tip, or the contact-to-work distance (CTWD), is increased relative to conventional SAW processes, e.g., longer than about 25 mm. As used herein, LSO refers to an electrode configuration in which the electrical stick-out exceeds about 10 times a diameter of the electrode 306A. The longer stick-out length allows for a greater length of the electrode to be preheated prior to melting at the electrode tip. The preheating allows for melt-off rate to increase as a result, as it is easier to melt a preheated electrode wire for a given current density. The LSO SAW process can provide significant improvement in productivity and can provide up to 100% increase in submerged arc welding deposition rates over traditional SAW processes. The LSO SAW process can reduce or eliminate arc striking problems by allowing complete tailoring of the arc start characteristics. The LSO SAW can also provide improved control over the input of energy into the weld, lower heat input (less distortion), flux/wire ratio reduction.

FIG. 3B depicts an electrode assembly 300B positioned over the groove 303 in workpiece 302. The electrode assembly 300B employs an LSO technology such that the electrical stick-out 316B extends beyond the contact tip 310B by substantially more than the stick-out 316A extending beyond the contact tip 310A (FIG. 3A). For example, in some embodiments, the stick-out 316B can have a length between 10 and 40 times the diameter of the electrode 308B. In some embodiments, the stick-out 316B can have a length that is more than 40 times the diameter of the electrode 308B. The increased length of the stick-out portions 316B allows for a greater length of the electrode 306B to be preheated prior to melting at the electrode trip, thereby allowing for increased melt-off and deposition rates, as explained above.

Figure 4B:
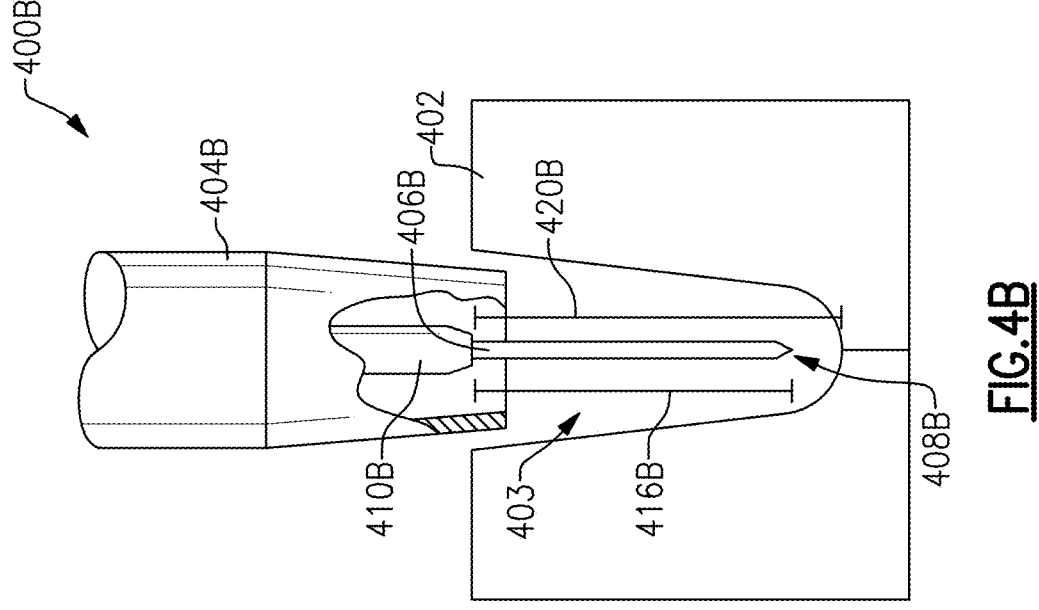
FIG. 4B illustrates an LSO electrode assembly for a SAW system over a workpiece having a deep groove.
Figure 4A:
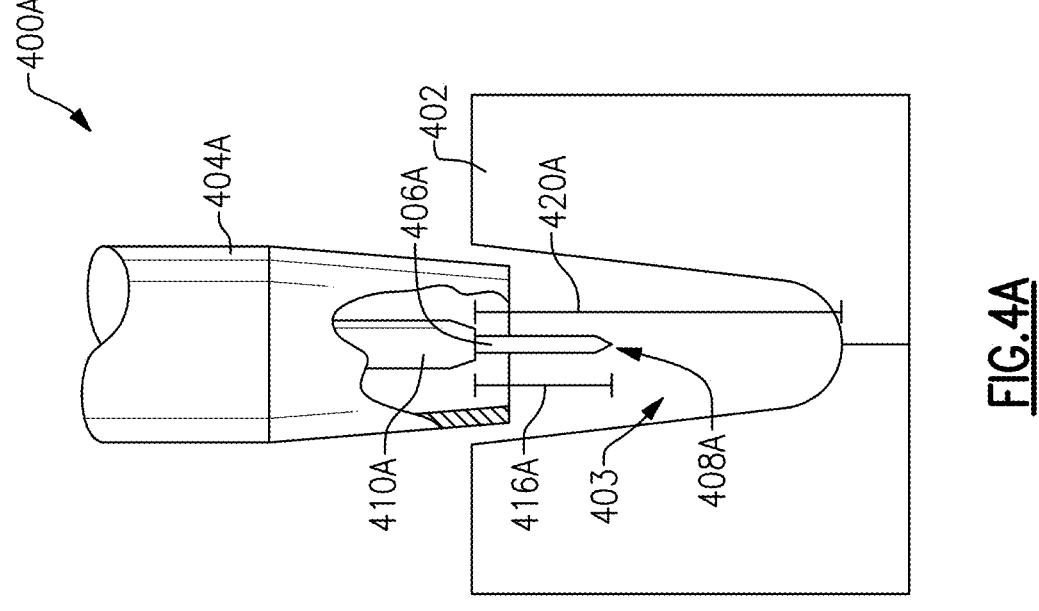
FIG. 4A illustrates a conventional electrode assembly for a SAW system over a workpiece having a deep groove.

The increased length of the stick-out portions in LSO SAW systems also allows for the LSO systems to be used to easily fill grooves that conventional SAW systems are either incapable of filling or can only fill using extremely precise arrangements and high operator skill. Specifically, while conventional SAW systems can be used with wide and/or short grooves, conventional SAW systems typically cannot be easily used with deeper and/or narrower grooves. FIGS. 4A and 4B depict electrode assemblies 400A, 400B positioned over a workpiece 402, where the electrode assembly 400A is generally similar to the assembly 300A shown above in connection with FIG. 3A and electrode assembly 400B is generally similar to the assembly 300B shown in above in connection with FIG. 3B. The workpiece 402 has a groove 403 which is substantially deeper and narrower than the groove 303 shown in above in FIGS. 3A and 3B. Accordingly, when the assemblies 400A and 400B are placed over the groove 403, the head portions 404A, 404B are positioned further from the bottom of the groove, resulting in the CTWD 420 being substantially longer than 25 mm. For example, in some embodiments, the CTWD or electrical stick-out can be 125 mm or longer. When the electrode assembly 400A is positioned over the workpiece 402 such that the tip 408A is within the groove 403, the size and shape of the head portion 404A prevents it from being positioned further within the groove 403 without contacting and interacting with the workpiece 402. As a result, the tip 408A is spaced excessively far from the bottom of the groove 403, which results in poor arcing between the electrode 406A and the workpiece 402, thereby resulting in a poor filler metal deposition rate and poor weld quality. Accordingly, the conventional stick-out length 416A of the electrode assembly 400A prevents the electrode assembly 400A from forming high-quality welds within deep and/or narrow grooves. In contrast, when the electrode assembly 400B is positioned over the workpiece 402B such that the tip 408B is within the groove 403, the increased stick-out length of the assembly 400B allows for the tip 408B to be adjacent to the bottom of the groove. The reduced distance between the tip 408B and the bottom of the groover 403 results in better arcing between the electrode 406B and the workpiece 402. Accordingly, in addition to improving weld quality and deposition rates due to allowing for additional preheating of the electrode prior to arcing, LSO SAW techniques also allow for the deposition of filler metal into the deeper and narrower grooves than conventional SAW techniques.

According to various embodiments, the LSO SAW electrode assemblies are capable of achieving significantly higher deposition rates compared to conventional SAW electrode assemblies for the same current. During the welding process, current is transferred into the electrode by the contact tip at a specific amperage and voltage. As the current flows through the electrode toward the tip of the electrode, the voltage drops and the electrode heats up. At the tip of the electrode, the current arcs to the workpiece. For LSO SAW assemblies, the increased length of the electrode results in a higher fraction of the total voltage drop occurring within the electrode than in conventional SAW assemblies. In some embodiments, the LSO SAW assemblies can be configured such that the voltage drop between the contact tip and the tip of the consumable electrode is at least 5%, at least 10%, at least 15%, or at least 20% (or is a value in a range defined by any of these values) of a total voltage drop across the total CTWD. In other embodiments, the electrode assembly is configured such that the voltage drop between the contact tip and the tip of the consumable electrode represents at least $\frac{1}{30}$ of the total voltage drop across the CTWD, $\frac{1}{15}$ of the total voltage drop across the CTWD, $\frac{1}{10}$ of the total voltage drop across the CTWD, $\frac{1}{7}$ of the total voltage drop across the CTWD, $\frac{1}{5}$ of the total voltage drop across the CTWD, or a value in a range defined by any of these values. For example, in a conventional SAW electrode assembly where the total voltage drop along the CTWD is 30V, only about 1V of that total voltage drop may occur within the consumable electrode while the rest (about 29V) may drop across the arc length. In contrast, for an LSO SAW system of the same total voltage drop of 30V, about 4V of that drop may occur across the CTWD while the rest (about 26V) may drop cross the arc length. The increased voltage drop through the longer electrode results in the electrode being heated to a higher temperature than the electrode in a conventional SAW configuration and, as a result, the deposition rate increases.

Figure 5:
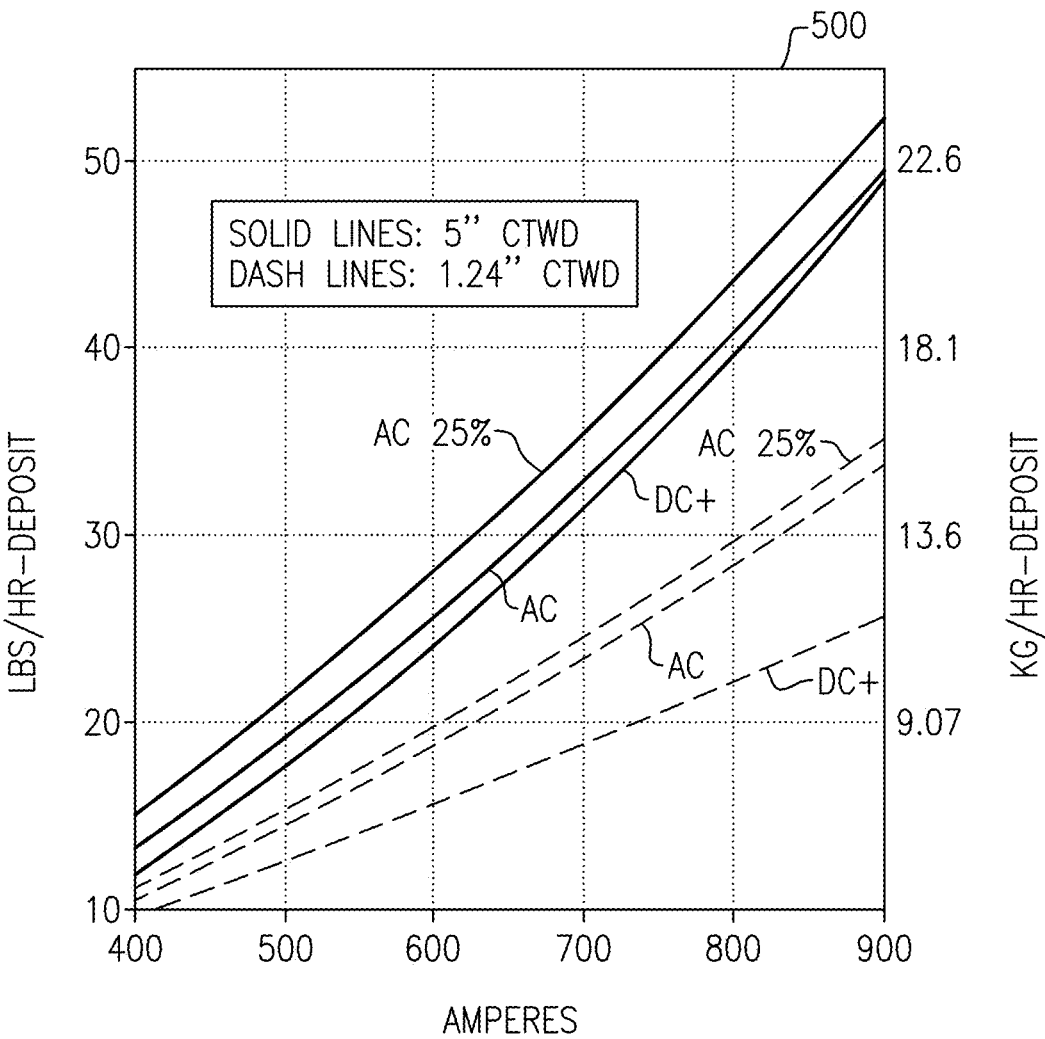
FIG. 5 is a graph showing an experimental comparison of deposition rates versus current for both conventional SAW assemblies and LSO SAW assemblies.

Experiments have shown that the deposition rate per current for LSO SAW assemblies can exceed 0.05 lbs./hr./A, 0.06 lbs./hr./A, 0.07 lbs./hr./A, 0.08 lbs./hr./A, or a value in range defined by any of these values during welding. FIG. 5 illustrates an experimental comparison of deposition rates versus current for both conventional SAW assemblies and LSO SAW assemblies, where the dashed lines represent the deposition rates for conventional SAW assemblies and the solid lines represent the deposition rates for the LSO SAW assemblies. In this experiment, the CTWD for the conventional SAW assembly was 1.25", the CTWD for the LSO SAW assembly was 5", and the diameter of the electrode was $\frac{5}{32}$". Three different power delivery methods were used: positive constant DC power, balanced square wave AC power, and 25% balanced square wave AC power. For the LSO SAW assemblies, a deposition rate exceeding 35 lbs./hr. can be achieved with current less than about 900 A, 850 A, 800 A, 750 A, 700 A, or in a range defined by any of these values, e.g., at about 700 A-750 A. For conventional SAW electrode assemblies, however, similar deposition rates are only projected to be achieved at a current exceeding about 900 A. Advantageously, the improvement in deposition rate over conventional SAW electrodes increases at higher current, as Joule heating ($I^2R$) varies as a square of current. That is, the relative improvement in deposition rate is projected to increase with increasing current.

In LSO SAW systems, the consumable electrode (e.g., electrodes 306B, 406B) extends beyond the end of the head portion (e.g., head portions 304B, 404B) such that the arcing tip (e.g., tips 308B, 408B) is visible. As previously discussed, the portion of the electrode that extends beyond the contact tip portion is referred to as the electrical stick-out. In some embodiments, the electrical stick-out is based on the diameter of the electrode. The length of the electrical stick-out in SAW can depend on the type of steel being welded, e.g., whether the steel being welded is a low alloy steel containing less than about 8 wt. % of non-iron elements or a high alloy steel containing greater than about 8 wt. % of non-iron elements. In conventional SAW for welding low and mild steel, the electrical stick-out length can be approximately 7-10 times the diameter of the electrode. In conventional SAW for welding high alloy steel, the electrical stick-out length can be approximately 3-5 times the diameter of the electrode. For example, in embodiments where the diameter of the electrode is 5/32", the visible stick-out length can be approximately 1-1.5 inches. In contrast, in LSO SAW according to various embodiments, a stick-out-to-diameter ratio, or a ratio between an electrical stick-out distance, measured between a contact tip portion disposed at an end of the head portion and the arcing tip of the consumable electrode, and a diameter of the electrode exceeds 15, 20, 25, 30, 35, 40, 45, 50, 55, 60 or has a value in a range defined by any of these values. For example, these ratios can be obtained by electrical stick-out distance exceeding 125 mm, 130 mm, 135 mm, 140 mm, 145 mm, 150 mm, 155 mm, 160 mm, 165 mm or a value in a range defined by any of these values, and a diameter of the electrode having any value between 2.5 mm and 5.0 mm. For instance, for an electrical stick-out length of 155 mm and an electrode diameter of 3.2 mm, the stick out-to-diameter ratio is about 48, whereas for an electrical stick-out length of 125 mm and an electrode diameter of 4.0 mm, the stick-out-to-diameter ratio is about 31.

While increased stick-out length can advantageously provide certain advantages, such as higher deposition rate, various problems can arise for stick-out lengths exceeding, e.g., 25 mm, when conventional electrode assemblies are used. For example, the heated wire can move out of alignment and wander in the welding groove as the stick-out distance increases. This can pose a problem especially in welding deep and narrow grooves that may be used to minimize time and cost of joining thick sections, as LSO welding electrode assemblies can be too bulky to reach the bottom of the groove. To address this and other challenges, some electrode assemblies include an extension portion that serves as an insulated guide for the electrode. The extension portion provides, among other things, electrical and thermal insulation as well as mechanical rigidity to the heated electrode. However, some extensions may not be suitable for some applications, e.g., for filling narrow and deep grooves such as a triangular or U-shaped groove having a depth exceeding 4 inches and having an angle of an apex that is 16 degrees or less. Some designs of the electrode assemblies that include extension portions may be insufficient with respect to one or more of: optimized vertical and lateral dimensions, thermal and electrical insulation, arc instability caused by magnetic materials and compact flux delivery. In contrast, various embodiments of the electrode assembly for submerged arc welding described herein address these and other needs.

Long Stick-Out Electrode Assembly with Single Piece Insulating Extension Portion Disclosed herein are various electrode assemblies for improved LSO SAW and method of manufacturing and using the same. In various embodiments, the insulating extension portion comprises a solid ceramic tip between the contact tip portion and the exposed portion of the wire. FIGS. 6A and 6B illustrate an electrode assembly 600 configured for long stick-out submerged arc welding including an insulating tip, according to various embodiments. The electrode assembly 600, according to various embodiments, comprises a head portion 602 and an extension portion 604. The head portion 602 and the extension portion 604 are arranged serially and configured to feed a consumable electrode 606 therethrough. The extension portion is formed of a single piece insulating article configured for the consumable electrode to finally pass through before the arcing tip is exposed. The electrode assembly 600 is configured for SAW. As such, according to embodiments, the electrode assembly 600 is configured for a SAW system to be used without a shielding gas.

The head portion 602 comprises a main body portion 608 and a contact nozzle 612. The extension portion 604 is removably but securely attached to the head portion 602 at the contact nozzle 612 such that the extension portion 604 remains aligned with the head portion 602 during the welding process. As will be discussed in greater detail below, the main body portion 608 has a cylindrical shape while the contact nozzle 612 and the extension portion 604 each have a generally cylindrical shape that tapers inward towards an end from which the consumable electrode 606 exits. Accordingly, with this configuration, the electrode assembly 600 also has a generally cylindrical shape that tapers inwards such that a width of the electrode assembly 600 at the main body portion 608 is larger than a width of the electrode assembly 600 at the extension portion 604.

The electrode assembly 600 also includes an attachment nipple 614 securely coupled to an end of the contact nozzle 612. The attachment nipple 614 is configured to securely attach to a wire feeding unit and has an opening formed through it. During welding, the wire feeding unit is configured to provide the consumable electrode 606 to the electrode assembly 600 by passing the consumable electrode 606 through the opening in the attachment nipple 614.

The main body portion 608 includes an electrical contact portion 610. The electrical contact portion 610 is configured to be electrically connected to a power source (e.g., power supply 108 in FIG. 1) and is configured to receive power from the power source during welding. At least the outer portion of the main body portion 608 is formed of an insulating material, e.g., fiber glass, while the electrical contact portion 604 and the contact nozzle 612 are both formed of a conductive material such as a copper-based alloy such that, when the electrical contact portion 610 receives power from the power source, the contact nozzle 612 receives the power through the electrical contact portion 610. As will be discussed in greater detail below, the contact nozzle 612 includes a contact tip that is configured to be in electrical contact with the consumable electrode 606 and is configured to provide this power to the consumable electrode 606 during the welding process.

The electrode assembly 600 receives the consumable electrode 606 through the attachment nipple 614 and the consumable electrode 606 passes through the head portion 602 and the extension portion 604. The consumable electrode 606 includes an arcing tip 622 and the consumable electrode extends through the extension portion 604 such that the arcing tip 624 extends beyond the extension portion 604. In this way, the head portion 602 is disposed to be distal to the arcing tip 624 and the extension portion 604 is disposed to be proximal to the arcing tip 624. During welding, the electrode assembly 600 is configured such that the arcing tip 624 is positioned adjacent to a workpiece.

The extension portion 604 is formed of a solid insulating material, e.g., a ceramic material, configured to electrically insulate the consumable electrode 606 from a workpiece during welding by surrounding the consumable electrode 606. The solid insulating material can be a machinable material such that the extension portion 604 is machined to have various physical attributes described herein. In some implementations, the solid insulating material may be a composite or layered insulator, e.g., a composite or layered ceramic. During welding, the consumable welding electrode 618 is preheated in the insulated extension portion 604 by Joule heating, prior to being melted at the arcing tip 624 of the consumable electrode 606. In some embodiments, the electrode assembly 600 is configured such that, during welding, the portion of the consumable electrode 608 within the extension portion 604 heats to a temperature up to 600° C., up to 700° C., up to 800° C., up to 900° C., or to a temperature in a range defined by any of these values. The solid insulating material is a suitable material that can withstand such elevated temperatures.

Figure 6C:
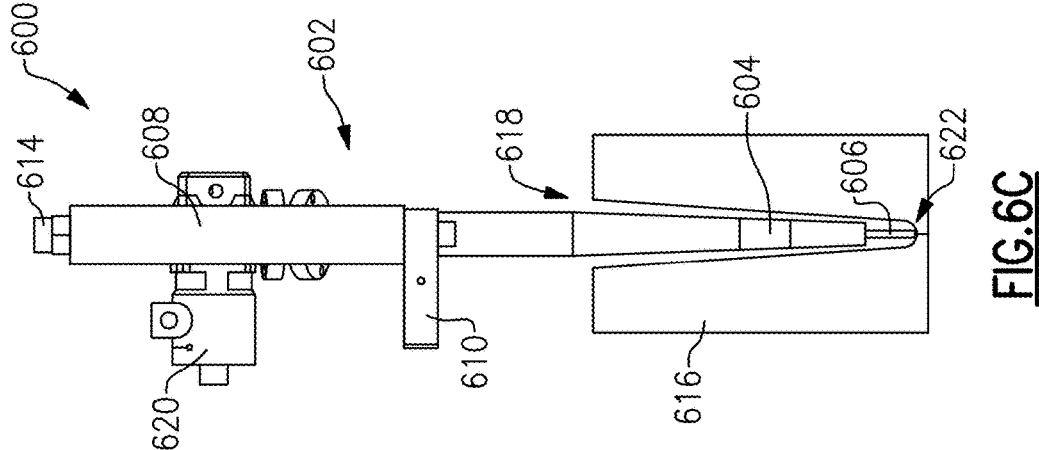
FIG. 6C is an isometric view of the LSO electrode assembly of FIG. 6A within a groove in a workpiece.
Figure 6B:
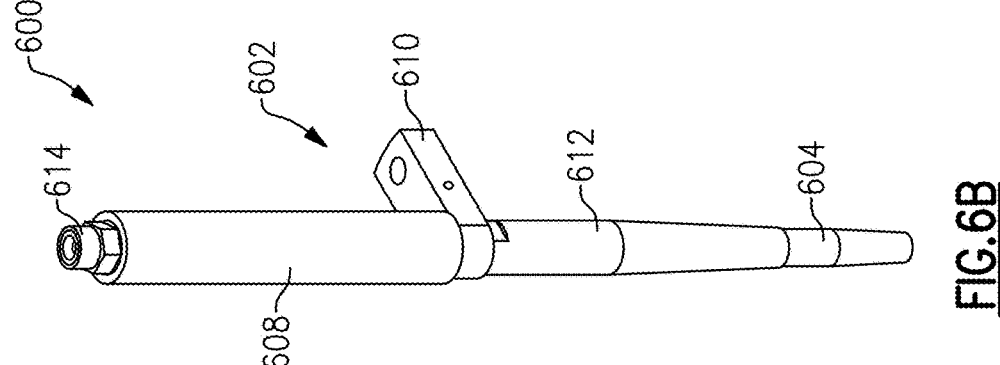
FIG. 6B depicts a perspective view of the LSO electrode assembly of FIG. 6A.
Figure 6A:
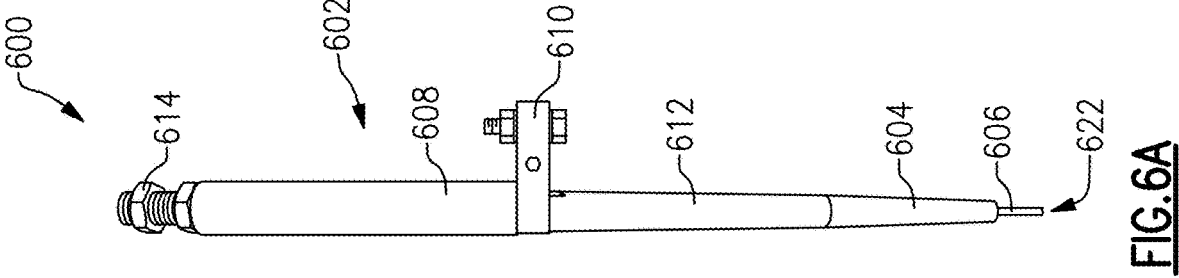
FIG. 6A is an isometric view of an LSO electrode assembly according to embodiments of the present technology.

FIG. 6C shows the electrode assembly 600 within a narrow groove 618 formed in a workpiece 616. An attachment apparatus 620 attached to the main body portion 608 can be used to securely hold the electrode assembly in place and at a desired orientation. In some embodiments, the attachment apparatus 620 comprises a clamping device configured to clamp onto an insulated outer layer of the main body portion 608.

In various embodiments, the extension portion 604 is configured to electrically insulate the consumable electrode 606 from the workpiece 614 and has a shape, length, and width such that the extension portion 604 is capable of being inserted into the narrow grooves 618. The solid insulating material enables, among other things, the shape and width of the extension portion 604 to be optimized for inserting the extension portion into narrow grooves as described herein. For example, in some embodiments, the extension portion 604 can have a width of about 18 mm. Additionally, as will be discussed in greater detail below, in some embodiments, the extension portion 604 can have a tapered shape such that the end of the extension portion 604 near the contact nozzle 612 is wider than the end of the extension portion 604 near the arcing tip 622. Additionally, the extension portion 604 can be sufficiently long and the consumable electrode 606 can stick out sufficiently far from the end of the extension portion 604 to ensure that, during welding, the extension portion 604 and consumable electrode are within the groove 618 while a portion of the head portion 602 can be disposed outside and over the groove 618. Additionally, the reduced width and tapered shape of the extension portion 604 allows for the extension portion 604 to not contact a sidewall of narrow grooves 616 during welding. For example, during welding, the extension portion 604 can be configured to not touch the sidewalls of a triangular trench having a depth exceeding 4 inches, 5 inches, 6 inches, 7 inches, or a value in a range defined by any of these values, and having an angle of an apex that is less than 16 degrees, 12 degrees, 10 degrees, 8 degrees, 6 degrees, or a value in a range defined by any of these values, while the tip 622 of the consumable electrode 606 contacts the apex. It will be appreciated that the shallower the groove 618, the narrower the apex angle.

For example, the relationship may follow an example dependence such as that shown in TABLE 1, without limitation. It will be appreciated that the grooves or trenches may not have a triangular shape in cross section. Instead, some grooves may have, e.g., a rectangular or tapered rectangular shape. In these geometries, the "apex" angle or the acceptance angle can be defined by an arctan of a width over depth of the trench.

TABLE 1

| Groove Depth | Apex Angle |
|---|---|
| >2 in. | <8 deg. |
| >3 in. | <10 deg. |
| >4 in. | <12 deg. |

Figure 7A:
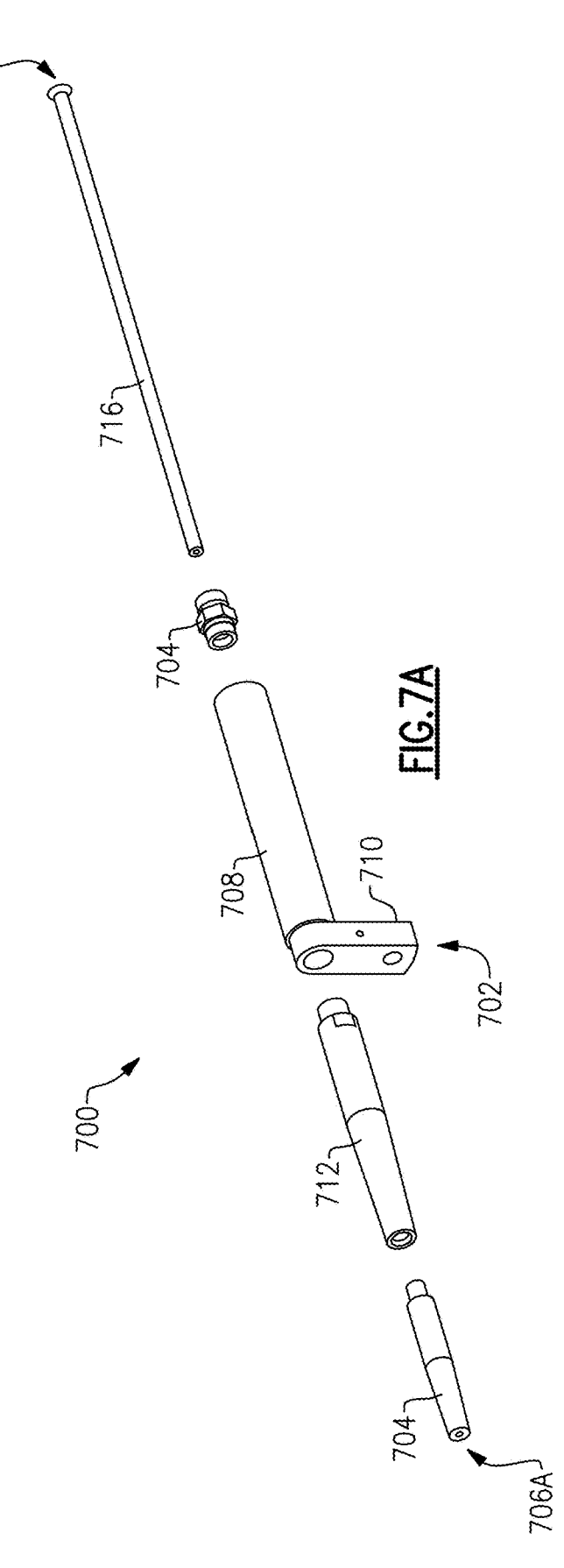
FIG. 7A is an exploded view of an LSO electrode assembly according to embodiments of the present technology.
Figure 7B:
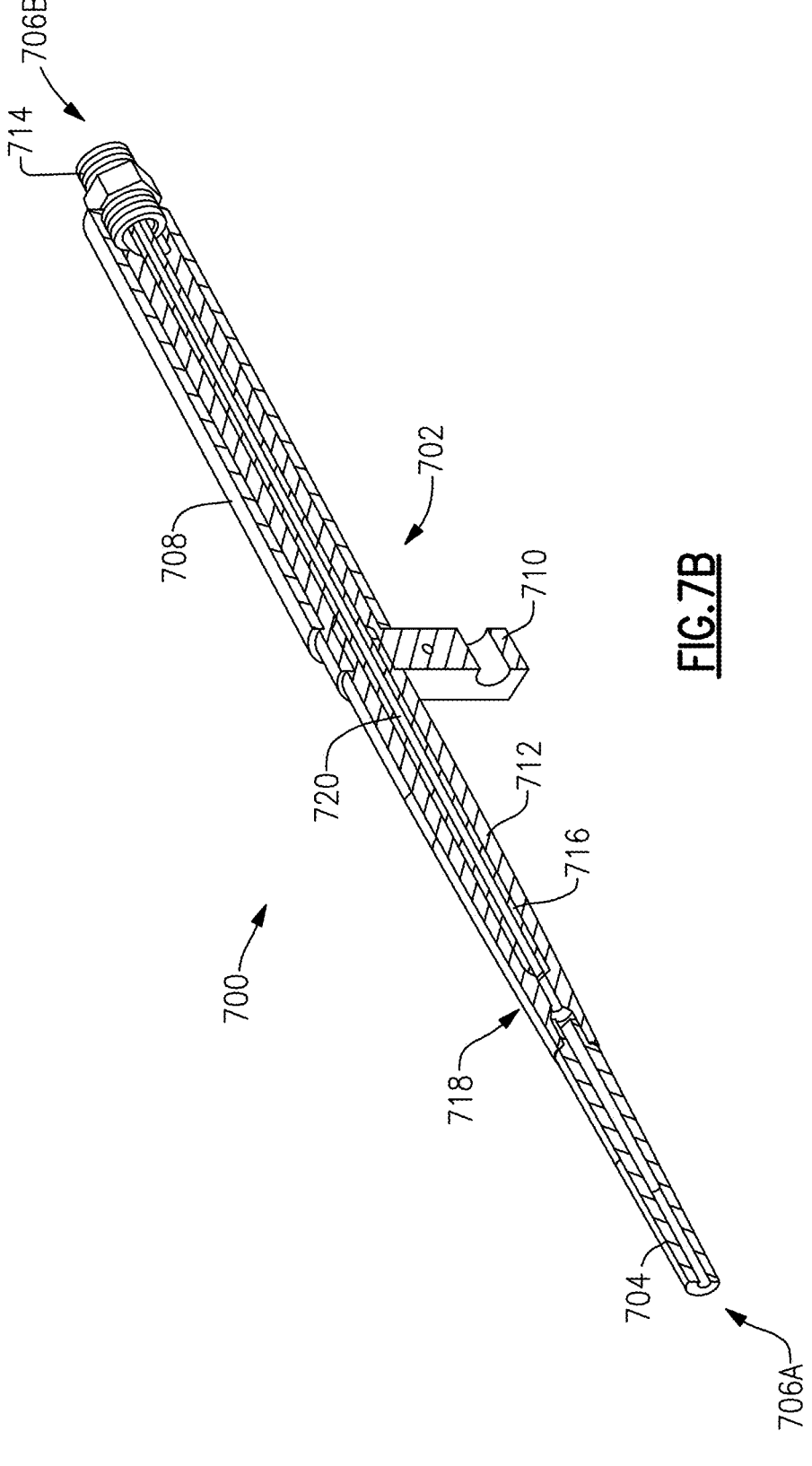
FIG. 7B is a cross-sectional view of the LSO electrode assembly depicted in FIG. 7A.

In various embodiments, the consumable electrode 606 is electrically insulated from at least the main body portion, the electrical contact portion 610 and a portion of the contact nozzle 612 by an electrical insulating tube disposed within the head portion and that surrounds at least a portion of the consumable electrode 606. FIG. 7A illustrates an exploded view of an electrode assembly 700, which may be generally similar to the electrode assembly 600 shown above in FIGS. 6A-6C, and FIG. 7B illustrates a cross-sectional view of the electrode assembly 700. The electrode assembly 700 includes a head portion 702 and an extension portion 704, where the head portion 702 comprises a main body portion 708, an electrical contact portion 710, and a contact nozzle 712. The contact nozzle 712 includes a contact tip 718 configured to be in contact with the consumable electrode and configured to provide power to the electrode during welding. It will be appreciated that, in the illustrated embodiment, because of the serial arrangement of the head portion 702 and the extension portion 704, the contact tip 718 and the extension portion 704 are also serially arranged, such that no portion of the extension portion 704 formed of a single piece article overlaps the contact tip 718. Further, the outer surface of the extension portion 704 forms the outermost surface of the electrode assembly 700 adjacent the arcing tip of the exposed consumable electrode. The electrode assembly 700 includes opposing first and second ends 706A, 706B, where the extension portion 704 defines the first end 706A and an attachment nipple 714 connects to the main body portion 708 at the second end 706B.

The electrode assembly 700 further includes an electrical insulating tube 716 disposed within the head portion 702. The electrical insulating tube 716 extends through an opening in the attachment nipple 714, the main body portion 708, the electrical contact portion 710, and a portion of the contact nozzle 712. Specifically, the electrical insulating tube 716 extends through the portion of the contact nozzle 712 between the contact tip 718 and the electrical contact portion 710 but does not extend through the contact tip 718. Accordingly, the electrical insulating tube 716 has a size and shape sufficient to allow the electrical insulating tube to extend from the second end 706B, through the main body portion 708, and at least partially through the contact nozzle 712 while also allowing for the consumable electrode to be disposed within electrical insulating tube 716. For example, in some embodiments, the electrical insulating tube 716 has a length of 385 mm and a width of 12 mm. In other embodiments, however, the insulating tube 716 has a different length and width. For example, in some embodiments the insulating tube has a length of 300 mm, 325 mm, 350 mm, 375 mm, 400 mm, 425 mm, or a value in a range defined by any of these values, and has a width of 20 mm, 15 mm, 10 mm, 5 mm, or a value in a range defined by any of these values. The electrical insulating tube 716 has a generally cylindrical shape and includes an opening 720 that extends along the length of the tube 716 through which the consumable electrode passes. Accordingly, the opening 720 is sufficiently wide for the consumable electrode to pass through. In some embodiments, the opening 720 has a width between 3.2 mm and 5 mm. In some embodiments, the width of the opening 720 depends on the size of the consumable electrode being used. For example, in some embodiments, the consumable electrode has a diameter of about 3.2 mm. In these embodiments, the opening 720 can have a width of 3.2 mm, 3.4 mm, 3.6 mm, 3.8 mm, 4 mm, or a value in a range defined by any of these values. In other embodiments, the consumable electrode has a diameter of about 4 mm. In these embodiments, the opening 720 can have a width of 4 mm, 4.2 mm, 4.4 mm, 4.6 mm, 4.8 mm, 5 mm, or a value in a range defined by any of these values.

The electrical insulating tube 716 can be formed of a suitable electrically insulating material. More specifically, the insulating tube is formed from a material having a high dielectric strength. For example, in some embodiments, the electrical insulating tube 716 is formed from polytetrafluoroethylene (PTFE) or Teflon®. In other embodiments, however, other electrically insulating materials can be used. For example, in some embodiments, the electrical insulating tube 716 can be formed fluorinated ethylene propylene (FEP), Kapton®, polyurethane, or poly vinyl chloride. Advantageously, forming the electrical insulating tube 716 from a material having a high dielectric strength allows for the electrical insulating tube 716 to act as an insulator such that it electrically insulates the consumable electrode from the head portion 702 before the consumable electrode passes through the contact tip 718. As will be discussed in greater detail elsewhere in the application, the main body portion 708, the electrical contact portion 710, and the contact nozzle 712 comprise metal and are configured to be charged with the current received by the electrical contact portion 710 from a power source during welding. Accordingly, the electrical insulating tube 716 helps to ensure that the consumable electrode is insulated from charged portions of the head portion 702 so that the consumable electrode does not inadvertently contact the head portion 702 and receive power prematurely, which would lead to inconsistent and unpredictable welding.

Figure 7D:
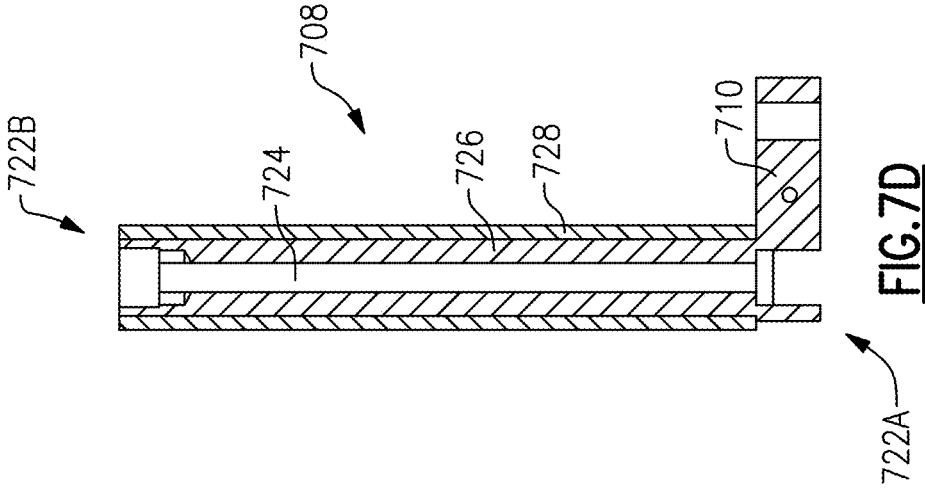
FIG. 7D is a cross-sectional view of the main body portion depicted in FIG. 7C taken along line A-A.
Figure 7C:
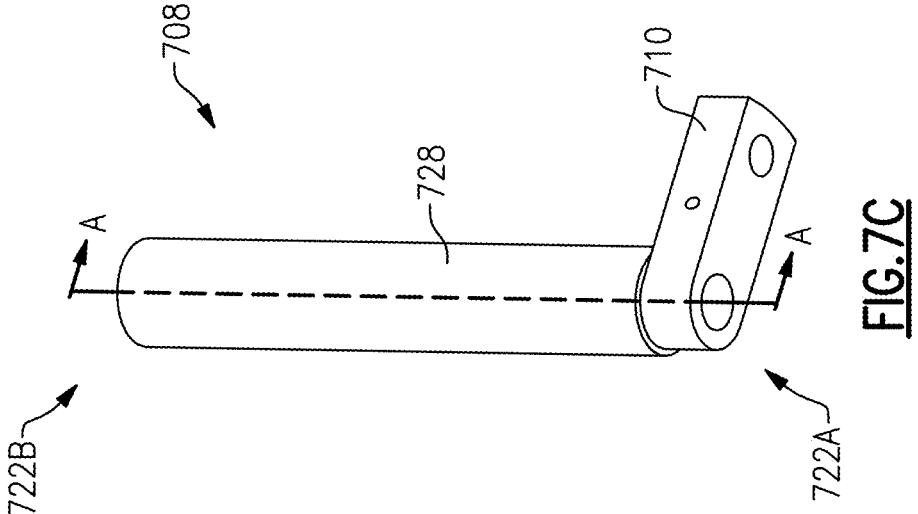
FIG. 7C is a perspective view of a main body portion for an LSO electrode assembly according to embodiments of the present technology.

FIG. 7C is a perspective view of the main body portion 708 and FIG. 7D depicts a cross-sectional view of the main body portion 708 taken along line A-A. The main body portion 708 has opposing first and second ends 722A, 722B and comprises an inner layer 726, an outer layer 728, and the electrical contact portion 710. The inner layer 726 defines a channel 724 that extends between the ends 722A, 722B. The channel 724 is configured to receive the electrical insulating tube 716 such that the electrical insulating tube 716 is disposed within the channel 724 and extends from the second end 722B through the first end 722A. The second end 722B is configured to receive the attachment nipple 714. In some embodiments, the second end 722B includes threads that the attachment nipple 714 is configured to screw in to.

In some embodiments, the channel 724 has a length of about 200 mm. In other embodiments, however, the channel 724 has a different length. For example, in some embodiments, the channel 724 has a length of 250 mm, 225 mm, 175 mm, 150 mm, 100 mm, less than 100 mm, or a value in a range defined by any of these values. In some embodiments, the channel 724 has a width such that, when the electrical insulating tube 716 is disposed within the channel 724, the electrical insulating tube 716 is in direct contact with a surface of the inner layer 726. For example, in some embodiments, the channel 724 has a width of about 12 mm. In other embodiments, however, the channel 724 has a different width. For example, in some embodiments, the channel 724 has a width of 20 mm, 15 mm, 10 mm, 5 mm, or a value in a range defined by any of these values. In some embodiments, the width of the channel 724 may be the same as the width of the electrical insulating tube 716 or may be only slightly larger than the width of the electrical insulating tube 716. For example, in embodiments where the electrical insulating tube 716 has a width of 12 mm, the channel 724 may have a width of 12 mm, 12.5 mm, 13 mm, 14 mm, 15 mm or a value in a range defined by any of these values.

The inner layer 726 and the electrical contact portion 710 can each be formed from metal and are electrically connected such that, during welding, a current received by the electrical contact portion 710 can flow into the inner layer 726. In some embodiments, the inner layer 726 and the electrical contact portion 710 are formed from a single piece of metal. During welding, the consumable electrode passes through the electrical insulating tube 716 disposed within the channel 724 and the electrical insulating tube 716 prevents the consumable electrode from contacting the inner layer 726. In this way, the electrical insulating tube 716 can electrically insulate the consumable electrode from the current received by the electrical contact portion 710 as the consumable electrode moves through the main body portion 708.

The outer layer 728 completely surrounds the inner layer 726 and, in some embodiments, is formed from an electrically insulating material having a high dielectric strength. For example, in some embodiments, the outer layer 728 is formed from a fiberglass-based material or a polymer-based material such as polytetrafluoroethylene (PTFE) or Teflon®. In some embodiments, an attachment apparatus (e.g., attachment apparatus 620 shown in FIG. 6C) can attach to the outer layer 728. Advantageously, forming the outer layer 728 from an electrically insulating material can prevent the current received at the electrical contact portion 710 from flowing into the attachment apparatus through the inner layer 726.

Figure 7F:
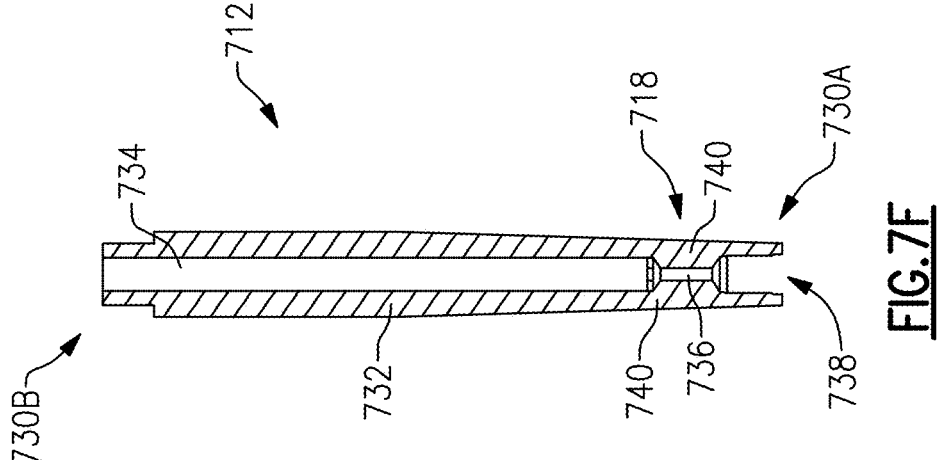
FIG. 7F is a cross-sectional view of the contact nozzle depicted in FIG. 7E taken along line B-B.
Figure 7E:
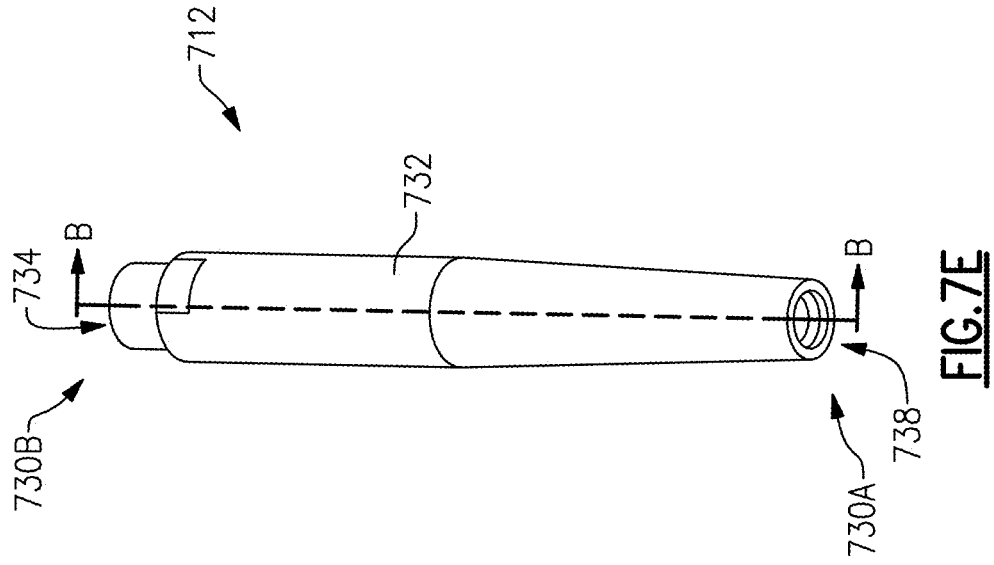
FIG. 7E is a perspective view of a contact nozzle for an LSO electrode assembly according to embodiments of the present technology.

FIG. 7E is a perspective view of the contact nozzle 712 and FIG. 7F is a cross-sectional view of the contact nozzle 712 taken along line B-B. The contact nozzle 712 has opposing first and second ends 730A, 730B and has walls 732 that define a channel 734 and a cavity 738. The channel 734 extends from the second end 730B to the contact tip 718 and is configured to receive the electrical insulating tube 716 (FIG. 7A) from the main body portion 708. The cavity 738 extends from the first end 730A to the contact tip 718 and is configured to receive an end of the extension portion 704. The contact tip 718 is formed from thicker portions 740 of the walls 732 that define a contact tip channel 736. The contact tip channel 736 extends between the channel 734 and the cavity 738 such that the contact tip channel 736 connects the channel 734 and the cavity 738. The cavity 738 may be threaded to receive a threaded end of the extension portion 704. As configured, the consumable electrode fed though the insulating tube 716 remains electrically insulated from the walls 732 until the consumable electrode contacts the walls of the contact tip channel 736.

The contact nozzle 712 has a generally cylindrical shape. In some embodiments, the contact nozzle 712 can have a length of 185 mm. In some embodiments, the walls 732 of the contact nozzle 712 taper inwards toward the first end 730A such that the width of the contact nozzle 712 at the first end 730A is less than the width of the contact nozzle 712 at the second end 730B. For example, in some embodiments, the second end 730B of the contact nozzle 712 has width of about 30 mm while the first end 730A of the contact nozzle 712 has a width of about 18 mm. In some embodiments, the width of the contact nozzle 712 can remain constant between the second end 730B and a midpoint of the contact nozzle but may begin tapering inwards from the midpoint to the first end 730A. Advantageously, the tapered first end 730A allows the contact nozzle 712 to be inserted into narrow grooves without contacting the sidewalls of the grooves. Additionally, as will be discussed in greater detail elsewhere in the application, the tapered first end 730A advantageously allows multiple electrode assemblies to be positioned more closely adjacent to each other when used in a multi-arc configuration.

During the welding process, the electrical insulating tube 716 is disposed within the channel 734 and the consumable electrode passes through electrical insulating tube 716 until it reaches the contact tip 718. At this point, the consumable electrode passes through the contact tip channel 736 and passes into the extension portion 706 disposed within the cavity 738. The contact tip channel is sized and shaped such that, as the consumable electrode passes through the contact tip channel 736, the consumable electrode contacts the thicker portions 740 of the walls 732. The walls 732 of the contact nozzle 712 are formed from metal and the second end 730B is configured to be inserted directly into the first end 722A of the main body portion 708 such that the walls 732 are in electrical contact with the metal inner layer 726 and electrical contact portion 710. Accordingly, during the welding process, when power is provided to the main body portion 708 via the electrical contact portion 710, current flows into the walls 732 of the contact nozzle 712. When the consumable electrode contacts the thicker portion 740 of the walls 732, the current then flows through the consumable electrode.

The contact nozzle 712 is configured such that the electrical insulating tube 716 passes into the channel 734. Specifically, the channel 734 has sufficient length and width such that the electrical insulating tube 716, when disposed within the channel 734, extends from the second end 730B to the contact tip 718, and stopped by the narrower contact tip channel 736. For example, in some embodiments, the channel 734 has a length of about 165 mm and a width of about 12 mm. In other embodiments, however, the channel 734 has a length of 140 mm, 150 mm, 160 mm, 170 mm, 180 mm, 190 mm, or a value in a range defined by any of these values, and has a width 6 mm, 8 mm, 10 mm, 12 mm, 14 mm, 16 mm, or a value in a range defined by any of these values. In some embodiments, the width of the channel 734 is the same the width of the channel 724 in the main body portion 708. In some embodiments, the width of the channel 734 may be the same as the width of the electrical insulating tube 716 or may be only slightly larger than the width of the electrical insulating tube 716. For example, in embodiments where the electrical insulating tube 716 has a width of about 12 mm, the channel 734 may have a width of 12 mm, 12.5 mm, 13 mm, 14 mm, 15 mm or a value in a range defined by any of these values.

While the channel 734 has a size and shape sufficient for the electrical insulating tube 716 to pass into it, the contact tip 718 is configured such that the electrical insulating tube 716 cannot pass into the contact tip channel 736 while the consumable electrode can pass through contact tip channel 736. Accordingly, the contact tip 718 is configured such that a width of the contact tip channel 736 (i.e., the distance between the thicker portions 740 of the walls 732) is less than the width of the electrical insulating tube 716 but larger than a diameter of the consumable electrode. In some embodiments, the width of the contact tip channel 736 is only slightly larger than consumable electrode such that, when the consumable electrode passes through the contact tip channel 736 during welding, the consumable electrode contacts the thicker portions 740 of the walls 732 of the contact nozzle 720, thereby allowing the contact tip 718 to apply the current into the consumable electrode. For example, in some embodiments, the contact tip channel 736 has a width of 4.2 mm. In some embodiments, the width of the contact tip channel 736 depends on the size of the consumable electrode. For example, in embodiments where the consumable electrode has a diameter of 3.2 mm, the contact tip channel 736 may have a width of 3.2 mm, 3.3 mm, 3.4 mm, 3.5 mm, 3.6 mm, or a value in a range defined by any of these values. In embodiments where the consumable electrode has a diameter of 4 mm, the contact tip channel 736 may have a width of 4 mm, 4.1 mm, 4.2 mm, 4.3 mm, 4.4 mm, or a value in a range defined by any of these values.

As configured, the contact tip channel 736 can define the point at which electrical stick out begins. As described herein, the lower end of the contact tip channel 736 defines one end of an electrical stick out, while an arcing tip defines the other end of the electrical stick out.

Figure 7H:
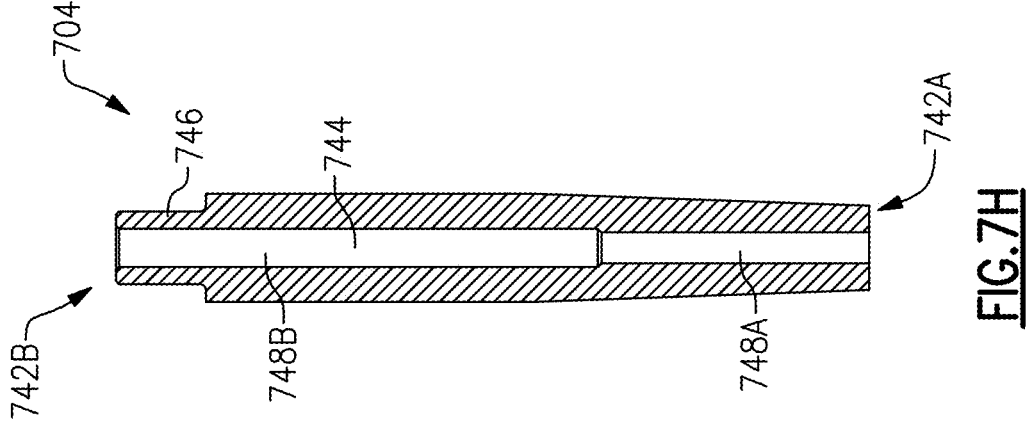
FIG. 7H is a cross-sectional view of the extension portion depicted in FIG. 7G taken along line C-C.
Figure 7G:
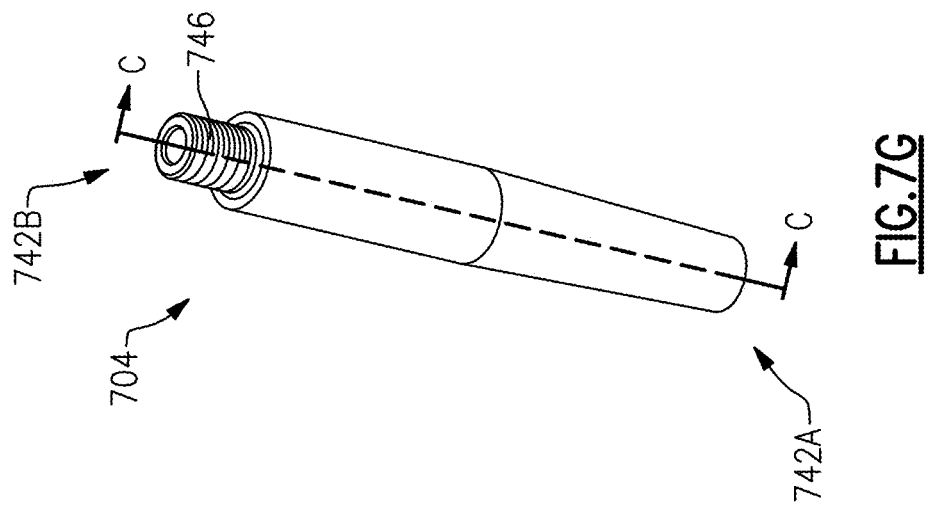
FIG. 7G is a perspective view of an extension portion for an LSO electrode assembly according to embodiments of the present technology.

FIG. 7G is a perspective view of the extension portion 704 and FIG. 7H is a cross-sectional view of the extension portion 704 taken along line C-C. The extension portion 704 includes first and second ends 742A, 742B and a channel 750 that extends between the first and second ends 742A, 742B and that is configured to receive the consumable electrode therein. The extension portion 704 further includes a threaded end portion 746 at the second end 742B. As will be discussed in greater detail below, the threaded end portion 746 is configured to be releasably installed into the cavity 738 at the first end 730A of the contact nozzle 712 (FIGS. 7E and 7F). In some embodiments, the threaded end portion 746 can have a width that is substantially the same as the width of the cavity 738. For example, in some embodiments, the cavity 738 and the threaded end portion 746 can each have a width of 12 mm. The threaded end portion 746 comprises threading configured to match with threading in the cavity 738 such that the extension portion 704 can be screwed into the cavity 738 of the contact nozzle 712. In this way, the extension portion 704 can be easily swapped out for a replacement extension portion if desired.

During welding, the extension portion 704 is configured to be inserted into a narrow groove of a workpiece so that the electrode assembly can deposit metal into the groove. Accordingly, the extension portion 704 is sized and shaped such that it can be easily inserted into the narrow groove without substantially contacting the sidewalls of the groove. As discussed elsewhere in this application, in various embodiments, the extension portion 704 has a generally cylindrical shape having at least a portion that tapers inwards toward the first end 742 such that the width of the extension portion 704 near the first end 742A is less than the width of the extension portion 704 near the second end 742B. For example, in some embodiments, portions of the extension portion 704 near the second end 742B (e.g., portions of the extension portion 704 adjacent to the threaded end portion 746) can have a width of about 18 mm while the portion of the extension portion 704 near the first end 742A has a width of about 14 mm. In other embodiments, however, the extension portion 704 can have a different width. For example, in some embodiments, portions of the extension portion 704 near the second end 742B can have a width of 24 mm, 22 mm, 20 mm, 18 mm, 16 mm, 14 mm, greater than 24 mm, less than 14 mm, or a value in a range defined by any of these values, and portions of the extension portion 704 near the first end 742A can have a width of 20 mm, 18 mm, 16 mm, 14 mm, 12 mm, 10 mm, more than 20 mm, less than 10 mm, or a value in a range defined by any of these values. In some embodiments, the width of the extension portion 704 can remain constant between the portions of the extension portion 704 adjacent to the threaded end portion 746 and a midpoint of the extension portion 704 but may begin tapering inwards from the midpoint to the first end 742A. For illustrative purposes only, roughly half of the length of the illustrated extension portion 704 is tapered. However, it will be appreciated that any suitable fraction of the length may be tapered, including substantially the entire length, e.g., greater than 20%, 40%, 60% or 80%, 100%, or a value in a range defined by any of these values. It will be further appreciated that the tapered sidewall may not be straight, but the degree of tapering may vary with length. For example, the degree of tapering may vary, e.g., continuously or discontinuously, throughout the tapered portion. As configured, the extension portion 704 can be configured to not touch the sidewalls of a narrow groove such as a generally triangular trench as described elsewhere in the application. Any portion of the tapered portion can be configured such that tangents of the exterior sidewalls form a triangle or a cone having an angle of an apex that is less than 16 degrees, 12 degrees, 10 degrees, 8 degrees, 6 degrees, or a value in a range defined by any of these values. Advantageously, the tapered first end 742A allows the extension portion 704 to be inserted into narrow grooves without contacting the sidewalls of the grooves. Additionally, as will be discussed in greater detail elsewhere in the application, the tapered first end 742A advantageously allows multiple electrode assemblies to be positioned more closely adjacent to each other when used in a multi-arc configuration.

In various embodiments, the extension portion 704 is configured to electrically and thermally insulate the consumable electrode from a work piece and has a sufficient length that the consumable electrode is preheated by Joule heating to a higher temperature than in conventional SAW systems. For example, in some embodiments, the extension portion 704 has a length of 125 mm. In other embodiments, the extension portion 704 has a length of 90 mm. In still other embodiments, however, the extension portion 704 can have a different length. For example, in some embodiments, the extension portion 704 can have a length of 25 mm, 50 mm, 75 mm, 100 mm, 125 mm, 150 mm, 175 mm, less than 25 mm, greater than 175 mm, or a value in a range defined by any of these values. Additionally, the extension portion 704 can be sufficiently long that, during welding, only the extension portion 704 is within the groove while other portions of the electrode assembly 700 are at least partly outside of the groove.

This arrangement also allows for the length of the electrical stick-out to be substantially longer than in conventional SAW assemblies. As previously discussed, the electrical stick-out is the distance between the contact tip (e.g., the contact tip 718 shown in FIGS. 7B and 7F) and the arcing tip (e.g., the arcing tip 622 of the consumable electrode 606 shown in FIGS. 6A and 6C). Accordingly, the electrical stick-out of the electrode assembly 700 is the sum of the length of the extension portion 704 and the length of the visual stick-out. The visible stick-out of the electrode assembly 700 is the portion of the consumable electrode that extends beyond the first end 742A of the extension portion 704 during welding and is therefore visible. In some embodiments, the visible stick-out length can be between approximately 7-10 times the diameter of the consumable electrode. For example, in embodiments where the consumable electrode has a diameter of 3.2 mm, the visible stick-out can be between about 22 mm and about 30 mm in length. Similarly, in embodiments where the consumable electrode has a diameter of 4 mm, the visible stick-out can be between about 28 mm and about 40 mm in length. In other embodiments, however, the length of the visible stick-out can be based on many different factors, including electrode diameter, current, voltage, deposition rate, workpiece composition, and electrode composition. Additionally, operators of the electrode assembly 700 can adjust the visible stick-out length dynamically during the welding process as needed. Accordingly, this configuration allows for the electrical stick-out to be substantially longer than the electrical stick-out for conventional SAW systems. For example, in embodiments where the extension portion 704 has a length of 125 mm, the electrical stick-out length can be 155 mm. In other embodiments, however, the electrical stick-out length can be different. For example, in some embodiments, the electrical-stick-out length can exceed 125 mm, 130 mm, 140 mm, 150 mm, 160 mm, 170 mm, 180 mm, or be a length in a range defined by any of these values. Similarly, in embodiments where the extension portion 704 has a length of about 90 mm, the electrical stick-out length can be about 120 mm. In other embodiments, however, the electrical stick-out length can exceed 90 mm, 100 mm, 110 mm, 120 mm, 130 mm, 140 mm, or be a length in a range defined by any of these values. Advantageously, the longer electrical stick-out substantially improves the deposition rate for a given current density, due to longer Joule-heated region provided by the extension portion 704. Additionally, a longer electrical stick-out also results in the flux-to-wire consumption ratio being lower than in conventional SAW assemblies because the electrode deposition rate increases while the flux consumption remains constant.

In representative embodiments, the extension portion 704 comprises a single piece insulating article formed of a suitable insulating material that thermally and electrically insulates the electrode as it passes through the extension portion 704. Advantageously, forming the extension portion 704 from an insulating material allows for increased preheating of the consumable electrode during the welding process because the insulating material prevents heat given off by the preheating electrode from transferring to the surrounding air. Instead, the extension portion 704 ensures that the heat is efficiently retained within the extension portion 704, thereby increasing the preheating of the electrode, which in turn results in higher deposition and melt off rates and higher productivity.

In some embodiments, the insulating material allows the extension portion 704 to contact groove sidewalls of the workpiece during welding without risking an electrical short. When the electrode is heated to above-described temperatures during welding, the insulating material may lose some of its resistivity. To prevent an electrical short between the sidewalls of the workpiece and the consumable electrode when the extension portion 704 contacts the sidewalls, the solid insulating material is configured to sustain a voltage difference of at least 5V, 10V, 15V, 20V, 25V, or a value in range defined by any of these values, without substantially conducting or breaking down when an outer surface of the extension portion 704 contacts the workpiece.

In some embodiments, the extension portion 704 is formed as a single piece article from an insulating ceramic material. For example, in some embodiments, the extension portion 704 is formed alumina (Al$_2$O$_3$) or silicon carbide (SiC). In other embodiments, however, other insulating materials can be used. For example, in some embodiments, the extension portion 704 comprises silicon nitride, magnesia-stabilized zirconia, yttria-stabilized zirconia, magnesium oxide, or a zirconia-toughened alumina. The ceramic extension portion 704 can be manufactured using various methods such as powder pressing, cold isostatic pressing, hot pressing, injection molding and slip casting. Additionally, in some embodiments, the extension portion 704 is machined while in other embodiments, the extension portion 704 is machined.

The extension portion 704 is configured such that the consumable electrode passes into the channel 744 from the contact nozzle 712 after contacting the contact tip 718. Accordingly, the channel 744 can be sized to allow the consumable electrode to pass through it. As shown in the illustrated embodiment, the extension portion 704 arranged as a single piece insulating article is configured to directly surround the consumable electrode without any intervening features or structures other than air. The channel 744 first and second portions 748A, 748B, where the first portion 748A is at the first end 742A of the extension portion 704 and the second portion 748B is at the second end 742B of the extension portion 704. In some embodiments, the first portion 748A is narrower than the second portion 748B. For example, in some embodiments, the first portion 748A has a width of about 5 mm while the second portion 748B has a width of about 6.5 mm. In some embodiments, the first portion 748A has a width that is about 1 mm wider than the electrode diameter, while the second portion 748B has a width that is about 1.5 mm wider than the electrode diameter. These widths allow for relatively free movement of the electrode while preventing excessive wandering of the electrode. Advantageously, the narrower end portion 748A allows for the consumable electrode to be more accurately positioned within the groove as it allows for less movement of the arcing tip of the electrode.

One additional advantage of utilizing the relatively narrow extension portion as described herein is that it facilitates using multiple electrode assemblies in multi-arc set-ups. When welding large pieces of metal together, it is sometimes desirable to use multiple electrode assemblies at the same time to further increase the filler metal deposition rate. During multi-arc welding, the tips of multiple electrodes should be positioned closely adjacent to each other such that each of the electrode tips is disposed within the same weld pool. However, it is often difficult to use conventional SAW electrode assemblies in a multi-arc set-up. This is because the large diameter of the head portions (e.g., head portions 204 (FIG. 2), 304A (FIG. 3A), 304B (FIG. 3B)) of conventional electrode assemblies makes it difficult for multiple electrode assemblies to be placed sufficiently close to each other to facilitate multi-arc welding. Additionally, the short length of the electrode stick-out portions (e.g., stick-out portions 316A, 416A) used in conventional SAW assemblies may require that the welding torches be arranged at a high angle with respect to each other to allow for the arcing tips of the respective electrodes to be sufficiently close to each other to be positioned within the same weld pool. Accordingly, it is challenging to use conventional SAW electrode assemblies in multi-arc set-ups because the large size of the head portions and the short stick-out length limit the number of electrode assemblies that can be used in multi-arc set-up while also making it difficult to position the torches when trying to weld within a groove. These and other challenges can be mitigated with extension portions according to embodiments having relatively narrow extension portions, as described herein.

Figure 8A:
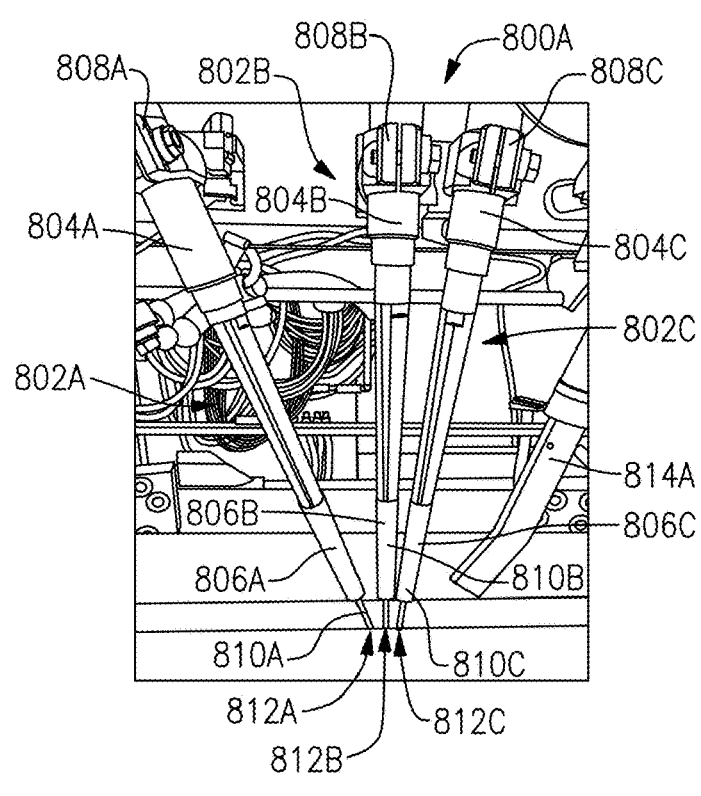
FIGS. 8A and 8B show multi-arc LSO SAW assemblies according to embodiments of the present technology.

FIG. 8A depicts a multi-arc SAW system 800A having first, second, and third electrode assemblies 802A, 802B, 802C. The first electrode assembly 802A includes a head portion 804A, an extension portion 806A, and a consumable electrode 810A having a tip 812A. Similarly, the electrode assembly 802B includes a head portion 804B, an extension portion 806B, and a consumable electrode 810B having a tip 812B, and the electrode assembly 802C includes a head portion 804C, an extension portion 806C, and a consumable electrode 810C having a tip 812C. The electrode assemblies 802A, 802B, 802C are generally similar to the electrode assembly 600 described above in connection with FIGS. 6A-6C and 7A-7H. The system 800A also includes attachment devices 808A, 808B, 808C and a flux delivery system 814A. The attachment devices 808A, 808B, 808C are generally similar to the attachment device 620 shown in FIG. 6C and can each be configured to securely hold their corresponding electrode assemblies 802A, 802B, 802C in place and at a desired orientation. The flux delivery system is configured to dispense flux onto a workpiece during the SAW process and can be configured such that it does not limit the dimensions of a groove of a workpiece that the extension portions 806A, 806B, 806C can be inserted into.

As previously discussed, the electrode assemblies 802A, 802B, 802C have a generally cylindrical shape that tapers inwards such that a width of the electrode assemblies at 802A, 802B, 802C near the extension portions 806A, 806B, 806C is less than a width of the electrode assemblies 802A, 802B, 802C away from the extension portions 806A, 806B, 806C. For example, while the extension portions 806A, 806B, 806C can have a width between about 14 and about 18 mm, the main body portion can have a width up to 30 mm. Additionally, the electrode assemblies can be configured such that the visible stick-out length of the consumable electrode is about 40 mm. With this configuration, the first, second, and third electrode assemblies 802A, 802B, 802C can be positioned such that the distance between adjacent tips 812A, 812B, 812C of the electrodes 810A, 810B, 810C is sufficiently small to allow for efficient multi-arc welding. Specifically, the shape, length, and width of the electrode assemblies 802A, 802B, 802C as described herein allows for the extension portions 806A, 806B, 806C to be simultaneously positioned within narrow and deep grooves such that the tips 812A, 812B, 812C are disposed within the same weld pool during the SAW process without the extension portions contacting the sidewalls of the grooves. For example, in some embodiments, the electrode assemblies 802A, 802B, 802C can be positioned such that, during welding, the distance between adjacent tips 812A, 812B, 812C is about 15 mm while the angle between adjacent electrode assemblies 802A, 802B, 802C is less than or equal to about 20 degrees. In other embodiments, however, the distant between adjacent tips and the angle between adjacent electrode assemblies 802A, 802B, 802C can be different. For example, the distance between adjacent tips 812A, 812B, 812C is 30 mm, 25 mm, 20 mm, 15 mm, 10 mm, 5 mm, or a value in a range defined by any one of these values, and the electrode assemblies 802A, 802B, 802C are oriented such that the angle between adjacent electrode assemblies 802A, 802B, 802C is 40 degrees, 35 degrees, 30 degrees, 25 degrees, 20 degrees, 15 degrees, 10 degrees, 5 degrees, or a value in a range defined by any one of these values. One of the electrode assemblies 802A, 802B, 802C can extend substantially vertically.

Figure 8B:
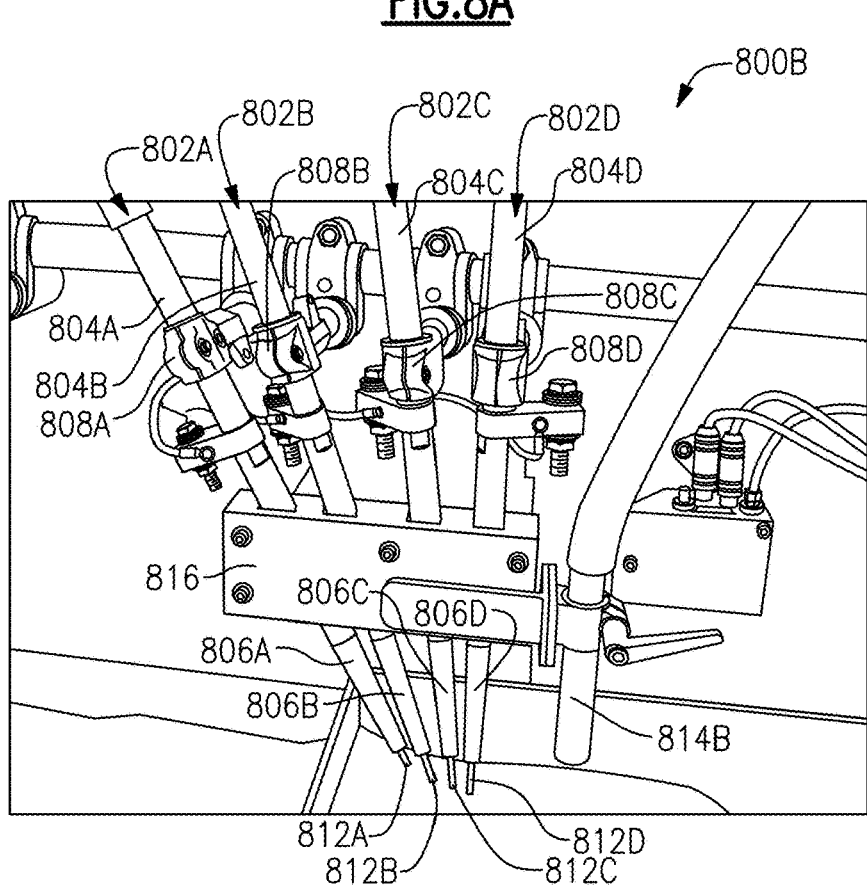

In the embodiment shown in FIG. 8A, the system 800A included three electrode assemblies 802A, 802B, 802C. However, this is only one example. In other embodiments, a multi-arc welding system can include a different number of electrode assemblies. Specifically, in various embodiments, a multi-arc SAW system can include two, three, four, five, or six electrode assemblies. For example, FIG. 8B depicts another multi-arc SAW system 900B having four electrode assemblies 802A, 802B, 802C, and 802D, where each of the electrode assemblies 802A, 802B, 802C, 802D is configured as described above in connection with FIG. 8A. The size, shape, and width of the electrode assemblies 802A, 802B, 802C, 802D as described herein allows for extension portions 806A, 806B, 806C, 806D to be simultaneously positioned within narrow and deep grooves such that the electrode tips 812A, 812B, 812C, 812D are all disposed within the same weld pool during the SAW process without the extension portions contacting the sidewalls of the groove. Specifically, the electrode assemblies 802A, 802B, 802C, 802D can be configured such that the distance between adjacent tips 812A, 812B, 812C, 812D is 30 mm, 25 mm, 20 mm, 15 mm, 10 mm, less than 10 mm, or a value in a range defined by any one of these values, and the angle between adjacent electrode assemblies 802A, 802B, 802C 802D is 40 degrees, 35 degrees, 30 degrees, 25 degrees, 20 degrees, 15 degrees, 10 degrees, 5 degrees, or a value in a range defined by any one of these values.

The system 800B also includes attachment devices 808A, 808B, 808C, 808D and also includes an alignment apparatus 816. The attachment devices 808A, 808B, 808C, 808D are generally similar to the attachment devices 620 shown in FIG. 6C and can each be configured to securely hold their corresponding electrode assemblies 802A, 802B, 802C, 802D in in place and at a desired orientation. The alignment apparatus 816 can be used in conjunction with the attachment devices 808A, 808B, 808C, 808D and can be used to ensure that the electrode assemblies 802A, 802B, 802C, 802D are aligned in an optimal orientation. Specifically, the alignment apparatus 816 can be used to make sure the electrode assemblies 802A, 802B, 802C, 802D are at a desired location and orientation relative to a workpiece and to each other while the attachment devices 808A, 808B, 808C, 808D can be used to keep the electrode assemblies 802A, 802B, 802C, 802D at the desired location and orientation during welding. Additionally, a flux delivery system 814B can be attached to the alignment apparatus 816 to ensure that the flux delivery system 814 remains properly aligned with the electrode assemblies 802A, 802B, 802C, 802D during welding.

Still referring to FIGS. 8A and 8B, according to embodiments, each of the first, second, third (and fourth) electrode assemblies 802A, 802B, 802C (and 802D) is configured such that each of the multiple electrodes independently receives power from a dedicated power supply (e.g., power supply 108 shown in FIG. 1). With this arrangement, each of the electrode assemblies can receive an independently controlled power, which allows for more consistent and efficient deposition of filler metal. Additionally, the current provided to each electrode assemblies can be varied for each electrode assembly such that individual electrode assemblies can receive different currents. In other embodiments, however, each of the electrode assemblies used in a multi-arc set-up can be coupled together in parallel such that each of the electrode assemblies shares the same current.

Extension Portion for Long Stick-Out Electrode Assembly with Partly Covered Ceramic Sleeve As discussed above, various design considerations of submerged arc welding (SAW) electrode assemblies configured for long stick-out (LSO), e.g., the designs of the extension portion, can be important for providing capability for welding narrow grooves with high deposition rates. Among various design considerations discussed above, maintaining the alignment of the heated electrode with an insulated guiding tip, e.g., a ceramic sleeve, can be particularly beneficial for stably guiding the electrode during welding. It will be appreciated that while ceramic materials may be a suitable for providing the requisite electrical and thermal insulation, they are brittle and may be prone to breakage. In addition, machining ceramic materials can be expensive. To address these and other needs, disclosed herein are cost-effective designs for an electrode assembly configured for LSO with an extension portion that is mechanically robust while being relatively inexpensive to manufacture.

Figure 9C:
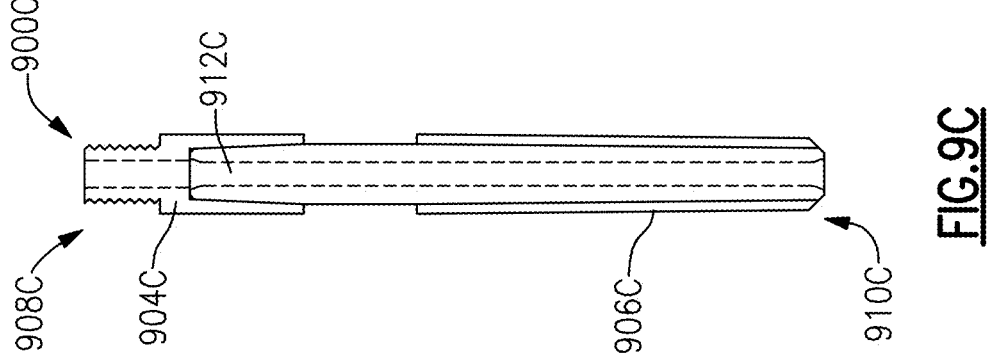
FIGS. 9A-9C show cross-sectional views of extension portions for an LSO electrode assembly according to embodiments of the present technology.
Figure 9B:
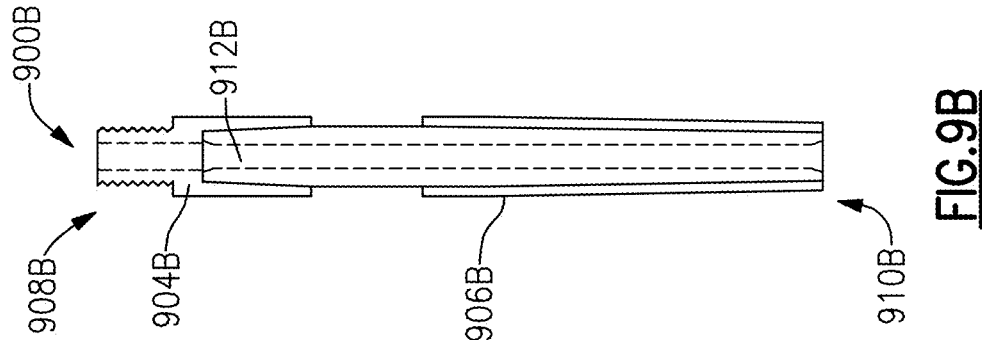
Figure 9A:
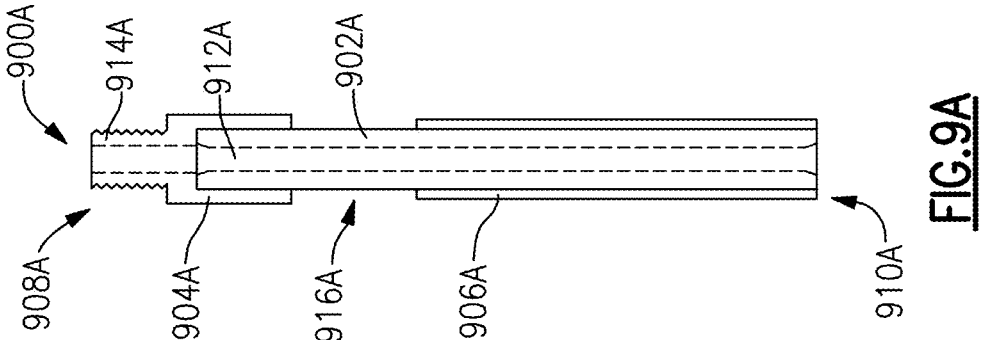

FIGS. 9A-9C illustrate extension portions 900A-900C configured to be used with a long stick-out electrode assembly (e.g., electrode assemblies 600, 700, and 800) with a partly covered ceramic sleeve, according to embodiments. The extension portions 900A-900C share various advantageous features, e.g., the physical dimensions and insulation capabilities adapted for welding narrow grooves, with the extension portions illustrated and described above (e.g., extension portions 604, 704, 804). However, unlike the previously-described extension portions, the extension portions 900A-900C each comprise a ceramic sleeve and a pair of metallic sheaths that cover opposing ends of the ceramic sleeve.

FIG. 9A illustrates an extension portion 900A according to some embodiments. The extension portion 900A comprises a ceramic sleeve 902A, a lower metallic sheath 904A or end cap, and an upper metallic sheath 906A or end cap. The ceramic sleeve 902A has opposing upper and lower ends 908A, 910A, where the lower metallic sheath 906A covers the lower end 910A and the upper metallic sheath 904A covers the upper end 908A. The ceramic sleeve 902A has a generally cylindrical shape and the upper and lower metallic sheathes 904A, 906A are configured to extend around the circumference of the ceramic sleeve 902A. The relatively simple shape of the ceramic sleeve 902A allows for it to be manufactured without machining, thereby reducing manufacturing cost. The extension portion 900A is configured to be removably attached to the contact tip portion (e.g., contact tip 718 of FIG. 7F) of the head portion (e.g., head portion 602 of FIGS. 6A-6C, 702 of FIG. 7A) and disposed to be proximal to the arcing tip of the consumable electrode relative to the contact tip portion. The ceramic sleeve 902A further includes a channel 912A that extends between the upper end 908A and lower end 910A and that is configured to slidingly feed the consumable electrode therethrough. The channel 912A can be configured similarly to the channel 744 or portions thereof described above with respect to FIG. 7H.

The ceramic sleeve 912A can be formed of a material similar to that described above with respect to the insulating material of the extension portion 704 (FIGS. 7G and 7H). The insulating material can be selected from the group consisting of silicon nitride, magnesia-stabilized zirconia, yttria-stabilized zirconia, silicon carbide, magnesium oxide, alumina or a zirconia-toughened alumina. The ceramic sleeve 912A can be manufactured using various methods such as powder pressing, cold isostatic pressing, hot pressing, injection molding and slip casting. Advantageously, the ceramic sleeve 912A may not be machined due to relatively simple shape.

The upper and lower sheathes 904A, 906A are formed of a metal. Advantageously, metal is significantly easier to machine than ceramic, thus allowing for the upper and lower sheathes 904A, 906A to be machined with substantially greater flexibility and lower cost. Additionally, metal is substantially tougher than ceramic and less prone to brittle fracture. Accordingly, attaching the metallic sheaths 904A, 906A to the ceramic sleeve 902 can increase the toughness and durability of the extension portion 902A because the ceramic sleeve 902 is less likely to crack or fracture if the extension portion 900A contacts or impacts the workpiece during the welding process.

The extension portion 900A is configured to be mechanically coupled to the contact nozzle (e.g., contact nozzle 612 illustrated in FIGS. 6A-6C, 712 illustrated in FIGS. 7A and 7B) through the upper metallic sheath 906A. In the illustrated embodiment, the upper metallic sheath 904A includes a threaded nipple 914A that is configured to couple with threading on the contact nozzle (e.g., threading within the cavity 738 illustrated in FIG. 7F) to allow the upper metallic sheath 904A to releasably couple to the contact nozzle. Additionally, because the upper metallic sheath 904A (and the lower metallic sheath 904A) is formed from metal, the threads on the threaded nipple 914A can be substantially more durable and less likely to break, which can extend the useful lifespan of the extension portion 900A, thereby reducing costs.

In various embodiments, the metallic sheaths 904A, 906A can be suitably secured onto the ceramic sleeve 902A. For example, in some embodiments, the metallic sheaths 904A, 906A can be glued, soldered or brazed onto the ceramic sleeve 902A. Advantageously, the metallic sheaths 904A, 906A are securely attached to the ceramic sleeve 902A using a suitable sealant filling any gap that may exist between the inner surfaces of the metallic sheaths 904A, 906A (e.g., the surfaces of the sheathes 904A, 906A that face and are configured to be directly adjacent to the ceramic sleeve 902A) and the outer surfaces of the ceramic sleeve, such that the ceramic sleeve 902A and the metallic sheaths 904A, 906A are immobilized with respect to each other. The suitable sealant may be a relatively soft material and may serve as a shock absorbing layer between the ceramic sleeve 902A and the metallic sheaths 904A, 906A such that cracking of the ceramic sleeve 902A under mechanical or thermal stress is suppressed or prevented. Furthermore, even when the ceramic sleeve 902A cracks, the sealant can effectively prevent loose pieces from coming off and falling on the workpiece. In some implementations, the ceramic sleeve 902A is brazed onto the metallic sheaths 904A, 906A using a suitable brazing metal that has a melting temperature that is substantially lower than a melting temperature of the metallic sheaths 904A, 906A. Without limitation, suitable brazing metals include copper-based alloy, e.g., Cu/Sn alloys. In some other implementations, the ceramic sleeve 902A and the metallic sheaths 904A, 906A are immobilized with respect to each other using a suitable glass sealant that has a glass working temperature that is substantially lower than a melting temperature of the metallic sheaths. Without limitation, suitable glass sealants include a doped silica, e.g., a doped aluminosilicate glass or a heavily doped sodium silicate glass. Other sealants may be possible, e.g., high temperature epoxy that can withstand the outer temperature of the ceramic sleeve.

The metallic sheaths 904A, 906A are disposed at the opposing ends 908A, 910A of the ceramic sleeve 902A and are separated from each other by a gap 916A that exposes the outer surface of the ceramic sleeve therebetween. In some embodiments, the size of the gap 916A (e.g., the distance between the metallic sheaths 904A, 906A) is sufficiently large such that electrical shorting therebetween during welding (e.g., at an electrical bias therebetween exceeding 30V) is prevented.

The channel 912A has a suitable diameter that is slightly larger than the diameter of the electrode for slidingly the electrode therethrough. While the bulk of the middle portion of the channel 912A has a relatively constant diameter, one or both end portions of the channel 912A may be flared in some embodiments to have a diameter greater than that of a middle portion of the channel 912A, thereby enhancing the wire transfer therethrough.

The ceramic sleeve 902A has a straight cylindrical shape substantially along its entire length. In this configuration, each of the metallic sheaths 904A, 906A comprises a correspondingly straight cylindrical inner wall portion such that a cylindrical end of the ceramic sleeve 902A can be fitted thereinto. The resulting metallic sheaths 904A, 906A surround the straight cylindrical portion of the ceramic sleeve. In other embodiments, however, the ceramic sleeve can have tapered ends and the metallic sheathes are shaped to conform to the tapered ends. For example, FIGS. 4B and 4C illustrate alternative extension portions 900B, 900C. The extension portions 900B and 900C can be generally similar to the extension portion 900A. For example, extension portion 900B comprises a ceramic sleeve 902B, upper and lower sheathes 904B, 906B attached to upper and lower ends 908B, 910B of the ceramic sleeve 902B, and a channel 912B that extends along the length of the ceramic sleeve 902B. Similarly, extension portion 900C comprises a ceramic sleeve 902C, upper and lower sheathes 904C, 906C attached to upper and lower ends 908C, 910C of the ceramic sleeve 902C, and a channel 912C that extends along the length of the ceramic sleeve 902C. However, while the ceramic sleeve 902A of extension portion 902A has a straight cylindrical shape, the ceramic sleeves 902B, 902C are cylindrical but have a tapered or beveled outer surface portion extending from one or both ends thereof. For example, ceramic sleeve 902B is tapered inwards at both ends 908B, 908B such that the width of the ceramic sleeve 902B at the ends 908B, 910B is less than the width of the ceramic sleeve 902B at a midpoint of the ceramic sleeve 902B. Each of the metallic sheaths 904B, 906B comprises a correspondingly tapered cylindrical inner wall portion surrounding the tapered portion of the ceramic sleeve. As configured, in the ceramic sleeve may slip into the metallic sheaths with relative ease.

The ceramic sleeve 902C illustrated in FIG. 9C also has tapered ends. In addition, the ceramic sleeve 902C is formed such that one or both of the ends 908C, 910C is rounded. The rounded ends can further enhance resistance to chipping or cracking. Additionally, the lower metallic sheath 906C has an outer edge that is rounded

Additional Examples

1. An electrode assembly for submerged arc welding, comprising:

a head portion and an extension portion arranged serially and configured to feed a consumable electrode therethrough, wherein during welding, the head portion is disposed to be distal to an arcing tip of the consumable electrode and the extension portion is disposed to be proximal to the arcing tip of the consumable electrode, wherein the extension portion is configured to electrically insulate the consumable electrode from a work piece during welding with a solid insulating material surrounding the consumable electrode.

2. An electrode assembly for submerged arc welding, comprising:

a head portion and an extension portion arranged serially and configured to feed a consumable electrode therethrough, wherein during welding, the head portion is disposed to be distal to an arcing tip of the consumable electrode and the extension portion is disposed to be proximal to the arcing tip of the consumable electrode, wherein the extension portion is configured to electrically insulate the consumable electrode from a work piece and has a shape, length and a lateral dimension such that the extension portion is configured to capable of not contacting a sidewall of a triangular trench having a depth exceeding 4 inches and having an angle of an apex that is less than 16 degrees while the tip of the consumable electrode contacts the apex.

3. An electrode assembly for submerged arc welding, comprising:

a head portion and an extension portion arranged serially and configured to feed a consumable electrode therethrough, wherein during welding, the head portion is disposed to be distal to an arcing tip of the consumable electrode and the extension portion is disposed to be proximal to the arcing tip of the consumable electrode, wherein the extension portion is configured to electrically insulate the consumable electrode from a work piece during welding while having an outer surface formed of a substantially non-magnetic material surrounding the consumable electrode.

4. An electrode assembly for submerged arc welding, comprising:

a head portion and an extension portion arranged serially and configured to feed a consumable electrode therethrough, wherein during welding, the head portion is disposed to be distal to an arcing tip of the consumable electrode and the extension portion is disposed to be proximal to the arcing tip of the consumable electrode, wherein the extension portion is configured to electrically insulate the consumable electrode from a work piece and has a shape, length and a lateral dimension such that a contact-to-work distance (CTWD) between the head portion and the tip of the consumable electrode during welding exceeds 125 mm.

5. An electrode assembly for submerged arc welding, comprising:

a head portion and an extension portion arranged serially and configured to feed a consumable electrode therethrough, wherein during welding, the head portion is disposed to be distal to an arcing tip of the consumable electrode and the extension portion is disposed to be proximal to the arcing tip of the consumable electrode, wherein the extension portion is configured to electrically insulate the consumable electrode from a work piece during welding; and a flux delivery system fixedly attached to the extension portion and configured such that the flux delivery system does not limit dimensions of a groove of a workpiece the extension portion is capable of being inserted into.

6. An electrode assembly for submerged arc welding, comprising:

a head portion and an extension portion arranged serially and configured to feed a consumable electrode therethrough, wherein during welding, the head portion is disposed to be distal to an arcing tip of the consumable electrode and the extension portion is disposed to be proximal to the arcing tip of the consumable electrode, wherein the extension portion is configured to electrically insulate the consumable electrode from a work piece and has a shape, length and a lateral dimension such that the electrode assembly is configured to achieve a deposition rate per current exceeding 0.05 lbs./hr./A during welding.

7. An electrode assembly for submerged arc welding, comprising:

a head portion and an extension portion arranged serially and configured to feed a consumable electrode therethrough, wherein during welding, the head portion is disposed to be distal to an arcing tip of the consumable electrode and the extension portion is disposed to be proximal to the arcing tip of the consumable electrode, wherein the extension portion is configured to electrically insulate the consumable electrode from a work piece and has a shape, length and a lateral dimension such that the electrode assembly is configured to achieve a deposition rate exceeding 35 lbs./hr. at a current less than 900 A during welding.

8. An electrode assembly for submerged arc welding, comprising:

a head portion and an extension portion arranged serially and configured to feed a consumable electrode therethrough, wherein during welding, the head portion is disposed to be distal to an arcing tip of the consumable electrode and the extension portion is disposed to be proximal to the arcing tip of the consumable electrode, wherein the extension portion is configured to electrically insulate the consumable electrode from a work piece and has a shape, length and a lateral dimension such that the electrode assembly is configured to drop at least 5% of a total voltage drop cross a contact-to-work distance (CTWD) between the head portion and the tip of the consumable electrode.

9. An electrode assembly for submerged arc welding, comprising:

a head portion and an extension portion arranged serially and configured to feed a consumable electrode therethrough, wherein during welding, the head portion is disposed to be distal to an arcing tip of the consumable electrode and the extension portion is disposed to be proximal to the arcing tip of the consumable electrode, wherein the extension portion is configured to electrically insulate the consumable electrode from a work piece and has a shape, length and a lateral dimension such that the electrode assembly is configured to drop at fraction exceeding 2V of a total voltage drop cross a contact-to-work distance (CTWD) between the head portion and the tip of the consumable electrode.

10. An electrode assembly for submerged arc welding, comprising:
    a head portion and an extension portion arranged serially and configured to feed a consumable electrode therethrough, wherein during welding, the head portion is disposed to be distal to an arcing tip of the consumable electrode and the extension portion is disposed to be proximal to the arcing tip of the consumable electrode,
    wherein the extension portion is configured to electrically insulate the consumable electrode from a work piece and has a shape, length and a lateral dimension such that the electrode assembly is configured to heat the consumable electrode by Joule heating within the extension portion to a temperature up to 800° C.

11. An electrode assembly for submerged arc welding, comprising:
    a head portion and an extension portion arranged serially and configured to feed a consumable electrode therethrough, wherein during welding, the head portion is disposed to be distal to an arcing tip of the consumable electrode and the extension portion is disposed to be proximal to the arcing tip of the consumable electrode,
    wherein the extension portion is configured to electrically insulate the consumable electrode from a work piece during welding with a solid insulating material, wherein the solid insulating material has sufficient resistance such that it is configured to sustain a voltage difference of at least 5V without substantially conducting when an outer surface of the extension portion contacts the work piece.

12. An electrode assembly for submerged arc welding, comprising:
    a head portion and an extension portion arranged serially and configured to feed a consumable electrode therethrough, wherein during welding, the head portion is disposed to be distal to an arcing tip of the consumable electrode and the extension portion is disposed to be proximal to the arcing tip of the consumable electrode,
    wherein the extension portion comprises an insulating tip portion formed of a solid insulating material configured to electrically insulate the consumable electrode from a work piece during welding by surrounding the consumable electrode.

13. The electrode assembly according to any of the above claims, wherein the solid insulating material comprises a ceramic material.

14. The electrode assembly according to any of the above claims, wherein the solid insulating material comprises an insulating sleeve configured to pass the consumable electrode therethrough.

15. An electrode assembly for submerged arc welding configured for a long electrode stick-out length exceeding 25 mm, the electrode assembly comprising:
    a contact tip portion; and
    an extension portion removably attached to the contact tip portion and disposed to be proximal to an arcing tip of the consumable electrode relative to the contact tip portion, the extension portion comprising:
        a ceramic sleeve configured to slidingly feed the consumable electrode therethrough, and a pair of metallic sheaths covering opposing ends of the ceramic sleeve.

16. The electrode assembly of example 15, wherein a gap between the ceramic sleeve and each of the metallic sheaths is filled with a sealant such that the ceramic sleeve and the metallic sheaths are immobilized with respect to each other.

17. The electrode assembly of example 16, wherein the sealant has a melting temperature or a glass transition temperature that is substantially lower than a melting temperature of the metallic sheaths.

18. The electrode assembly of example 16, wherein the ceramic sleeve is brazed onto the metallic sheaths such that the sealant comprises a brazing metal.

19. The electrode assembly of example 16, wherein the sealant comprises a glass sealant.

20. The electrode assembly of any one of examples 15 to 19, wherein the metallic sheaths at the opposing ends are separated in a lengthwise direction of the ceramic sleeve by a separation distance, thereby exposing the ceramic sleeve such that electrical shorting is substantially prevented between the metallic sheaths at an electrical bias exceeding 30V.

21. The electrode assembly of any one of examples 15 to 20, wherein the extension portion is mechanically coupled to the contact tip portion through one of the metallic sheaths distal to the arcing tip relative to the contact tip portion.

22. The electrode assembly of example 21, wherein the one of the metallic sheaths mechanically coupling the extension portion to the contact tip portion comprises a threaded nipple.

23. The electrode assembly of any one of examples 15 to 22, wherein the ceramic sleeve comprises a straight cylindrical portion, and wherein each of the metallic sheaths comprises a correspondingly straight cylindrical inner wall portion surrounding the straight cylindrical portion of the ceramic sleeve.

24. The electrode assembly of any one of examples 15 to 23, wherein the ceramic sleeve comprises a tapered portion formed at one or both ends thereof, and wherein each of the metallic sheaths comprises a correspondingly tapered cylindrical inner wall portion surrounding the tapered portion of the ceramic sleeve.

25. The electrode assembly of any one of examples 15 to 24, wherein an inner cavity of the ceramic sleeve has one or both end portions that are flared to have a diameter greater than that of a middle portion of the inner cavity.

26. The electrode assembly of any one of examples 15 to 25, wherein an outer edge of one or both ends of the ceramic sleeve is rounded.

27. The electrode assembly of any one of examples 15 to 26, wherein the metallic sheath formed at an end closer to a stick-out portion of the electrode has an outer edge that is rounded.

28. The electrode assembly of any one of examples 15 to 27, wherein the metallic sleeves are formed of a steel.

29. The electrode assembly of any one of examples 15 to 28, wherein the ceramic sleeve is formed of a material selected from the group consisting of silicon nitride, magnesia-stabilized zirconia, yttria-stabilized zirconia, silicon carbide, magnesium oxide, alumina or a zirconia-toughened alumina.

30. The electrode assembly of any one of examples 15 to 29, wherein the extension portion is configured to electrically insulate the consumable electrode from a work piece and has a shape, length and a lateral dimension such that the extension portion is configured to be capable of not contacting a sidewall of a triangular trench having a depth exceeding 4 inches and having an angle of an apex that is less than 16 degrees while the tip of the consumable electrode contacts the apex.

31. The electrode assembly of any one of examples 15 to 30, wherein the extension portion is configured to electrically insulate the consumable electrode from a work piece during welding while having an outer surface formed of a substantially non-magnetic material surrounding the consumable electrode.

32. The electrode assembly of any one of examples 15 to 31, wherein the extension portion is configured to electrically insulate the consumable electrode from a work piece and has a shape, length and a lateral dimension such that a contact tip-to-work distance (CTWD) between the contact tip portion and the tip of the consumable electrode during welding exceeds 125 mm.

33. The electrode assembly of any one of examples 15 to 32, further comprising a flux delivery system fixedly attached to the extension portion and configured such that the flux delivery system does not limit dimensions of a groove of a workpiece the extension portion is capable of being inserted into.

34. The electrode assembly of any one of examples 15 to 33, wherein the extension portion is configured to electrically insulate the consumable electrode from a work piece and has a shape, length and a lateral dimension such that the electrode assembly is configured to achieve a deposition rate per current exceeding 0.05 lbs./hr./A during welding.

35. The electrode assembly of any one of examples 15 to 34, wherein the extension portion is configured to electrically insulate the consumable electrode from a work piece and has a shape, length and a lateral dimension such that the electrode assembly is configured to achieve a deposition rate exceeding 35 lbs./hr. at a current less than 900 A during welding.

36. The electrode assembly of any one of examples 15 to 35, wherein the extension portion is configured to electrically insulate the consumable electrode from a work piece and has a shape, length and a lateral dimension such that the consumable electrode drops at least 5% of a total voltage drop cross a contact-to-work distance (CTWD) between the contact tip portion and the tip of the consumable electrode.

37. The electrode assembly of any one of examples 15 to 36, wherein the extension portion is configured to electrically insulate the consumable electrode from a work piece and has a shape, length and a lateral dimension such that a stick-out portion of the consumable electrode drops at least 2V of a total voltage drop cross a contact-to-work distance (CTWD) between the contact tip portion and the tip of the consumable electrode.

38. The electrode assembly of any one of examples 15 to 37, wherein the extension portion is configured to electrically insulate the consumable electrode from a work piece and has a shape, length and a lateral dimension such that the electrode assembly is configured to heat the consumable electrode by Joule heating within the extension portion to a temperature up to 800° C.

39. The electrode assembly of any one of examples 15 to 38, wherein the extension portion is configured to electrically insulate the consumable electrode from a work piece during welding with a solid insulating sleeve, wherein the solid insulating sleeve has sufficient resistance such that it is configured to sustain a voltage difference of at least 5V without substantially conducting when an outer surface of the extension portion contacts the work piece.

40. An electrode assembly for submerged arc welding (SAW), comprising:

a head portion and an extension portion that are arranged serially to feed a consumable electrode therethrough such that, during SAW, the head portion is disposed to be distal to an arcing tip of the consumable electrode and the extension portion is disposed to be proximal to the arcing tip of the consumable electrode, wherein the head portion includes a contact tip configured to electrically contact the consumable electrode to deliver power thereto, and wherein the extension portion is formed of a single piece insulating article configured for the consumable electrode to finally pass through after passing through the contact tip and before the arcing tip is exposed.

41. The electrode assembly of example 40, configured such that, during SAW with the consumable electrode inserted therethrough, a ratio between an electrical stick-out distance, measured between the contact tip disposed at an end of the head portion and the arcing tip of the consumable electrode, and a diameter of the consumable electrode exceeds 30.

42. The electrode assembly of example 41, wherein the extension portion has a length of 80 mm or greater for the consumable electrode having a diameter of 3 mm or greater.

43. The electrode assembly of example 40, wherein the head portion comprises:

a main body portion; and a contact nozzle disposed between the main body portion and the extension portion and comprising the contact tip configured to electrically contact the consumable electrode to deliver power thereto.

44. The electrode assembly of example 43, further comprising an electrical contact portion disposed between the main body portion and the contact nozzle, wherein the electrical contact portion is electrically connected to the contact nozzle and configured to receive the power from a power source and to deliver the power to the contact tip.

45. The electrode assembly of example 44, further comprising an electrical insulating tube inserted through the head portion and configured to guide the consumable electrode.

46. The electrode assembly of example 45, wherein:

the contact tip is configured to apply the power to the consumable electrode; and the electrical insulating tube is configured to electrically insulate the consumable electrode from the main body portion, the electrical contact portion, and at least a portion of the contact nozzle.

47. The electrode assembly of example 43 wherein the contact nozzle has a length greater than 140 mm.

48. The electrode assembly of example 43, wherein:

the contact nozzle has opposing first and second ends, the first end of the contact nozzle is coupled to the electrical contact portion, the contact tip is at the second end, and the electrical insulating tube extends through the first end to the second end.

49. The electrode assembly of example 48, wherein the consumable electrode passes through the electrical insulating tube such that the electrical insulating tube is positioned between the consumable electrode and the main body portion, the electrical contact portion, and the portion of the contact nozzle.

50. The electrode assembly of example 49, wherein:
the contact nozzle includes sidewalls that extend between the first end and the contact tip,
the portion of the contact nozzle tip includes the sidewalls and the first end, and
the contact tip directly contacts the consumable electrode.

51. The electrode assembly of example 43, wherein the head portion and the contact nozzle comprise a metal.

52. The electrode assembly of example 45, wherein the electrical insulating tube comprises polytetrafluoroethylene.

53. An electrode assembly for submerged arc welding (SAW), comprising:
a head portion including a contact tip configured to electrically contact a consumable electrode to deliver power thereto; and
an extension portion arranged serially with the head portion in a wire feed direction, wherein the head portion and the extension portion are configured to feed a consumable electrode therethrough, wherein:
the extension portion is configured to be disposed to be proximal to an arcing tip of the consumable electrode relative to the head portion, and
the extension portion is formed of a single piece insulating article arranged to be serial to the contact tip.

54. The electrode assembly of example 53, wherein the extension portion comprises a single piece of insulating material.

55. The electrode assembly of example 54, wherein the single piece of insulating material comprises a ceramic.

56. The electrode assembly of example 53, wherein the extension portion has a length greater than 80 mm.

57. The electrode assembly of example 56, wherein the extension portion has a length greater than 120 mm.

58. The electrode assembly of example 53, wherein the extension portion has a shape, a length, and a width such that the extension portion is configured to not contact a sidewall of a triangular groove having a depth exceeding 4 inches and having an angle of an apex, that is less than 16 degrees while the tip of the consumable electrode contacts the apex.

59. An extension portion configured for a submerged arc welding electrode assembly, the extension portion comprising:
a single piece insulating article formed of a ceramic material having a length greater than 80 mm and configured to surround a consumable electrode,
wherein the extension portion is configured to be arranged serially to a contact tip of a head portion of the submerged arc welding electrode assembly.

60. The extension portion of example 59 wherein the extension portion has a length greater than 120 mm.

61. The extension portion of example 59 wherein:
the extension portion comprises opposing first and second end portions,
the first end portion is configured to be positioned proximal to the head portion and has a first width, the second end portion is configured to be positioned distal to the head portion and has a second width, and the second width is less than the first width.

62. The extension portion of example 61 wherein the first width is 18 mm and the second width is 14 mm.

63. The extension portion of example 61, wherein the extension portion comprises a tapered portion in which a width thereof decreases towards the arcing tip, wherein the tapered portion is configured such that tangents of an exterior surface of the extension portion form a triangle or a cone having an angle of apex that is less than 16 degrees.

64. The extension portion of example 63, wherein the extension portion has a shape, length and a lateral dimension such that the extension portion is configured to not contact a sidewall of a triangular groove having a depth exceeding 4 inches and having an angle of an apex that is less than 16 degrees while the tip of the consumable electrode contacts the apex.

65. The extension portion of example 61, wherein the first end portion comprises threading configured to releasably couple with threading on the head portion.

66. An electrode assembly for submerged arc welding (SAW), the electrode assembly comprising:
a head portion comprising a contact nozzle; and
an extension portion removably and serially attached to the contact nozzle and disposed to be proximal to an arcing tip of a consumable electrode relative to the contact nozzle, the extension portion comprising:
a ceramic sleeve configured to slidingly feed the consumable electrode therethrough, and
a pair of metallic sheaths covering opposing ends of the ceramic sleeve.

67. The electrode assembly of example 66, configured such that, during SAW with the consumable electrode inserted therethrough, a ratio between an electrical stick-out distance, measured between the contact tip disposed at an end of the head portion and the arcing tip of the consumable electrode, and a diameter of the consumable electrode exceeds 30.

68. The electrode assembly of example 66, wherein the electrical stick-out distance exceeds 125 mm.

69. The electrode assembly of example 66, wherein a gap between the ceramic sleeve and each of the metallic sheaths is filled with a sealant such that the ceramic sleeve and the metallic sheaths are immobilized with respect to each other.

70. The electrode assembly of example 69, wherein the sealant has a melting temperature or a glass transition temperature that is substantially lower than a melting temperature of the metallic sheaths.

71. The electrode assembly of example 69, wherein the ceramic sleeve is brazed onto the metallic sheaths such that the sealant comprises a brazing metal.

72. The electrode assembly of example 69, wherein the sealant comprises a glass sealant.

73. The electrode assembly of example 66, wherein the metallic sheaths at the opposing ends are separated in a lengthwise direction of the ceramic sleeve by a separation distance, thereby exposing the ceramic sleeve such that electrical shorting is substantially prevented between the metallic sheaths at an electrical bias exceeding 30V.

74. The electrode assembly of example 66, wherein the extension portion is mechanically coupled to the contact nozzle through one of the metallic sheaths distal to the arcing tip relative to the contact nozzle.

75. The electrode assembly of example 74, wherein the one of the metallic sheaths mechanically coupling the extension portion to the contact nozzle comprises a threaded nipple.

76. An extension portion configured for a submerged arc welding electrode assembly, the extension portion comprising:
   a ceramic sleeve configured to surround a consumable electrode, and
   a pair of metallic sheaths covering opposing ends of the ceramic sleeve,
   wherein the extension portion is configured to be arranged serially with a head portion of the submerged arc welding electrode assembly.

77. The extension portion of example 76, wherein the extension portion is configured such that during welding with the consumable electrode inserted therethrough, a ratio between an electrical stick-out distance, measured between a contact tip portion disposed at an end of the head portion and an arcing tip of the consumable electrode, and the diameter of the electrode exceeds 30.

78. The extension portion of example 76, wherein a gap between the ceramic sleeve and each of the metallic sheaths is filled with a sealant such that the ceramic sleeve and the metallic sheaths are immobilized with respect to each other.

79. The extension portion of example 76, wherein the ceramic sleeve comprises a straight cylindrical portion and wherein each of the metallic sheaths comprises a correspondingly straight cylindrical inner wall portion surrounding the straight cylindrical portion of the ceramic sleeve 80. The extension portion of example 76, wherein the ceramic sleeve comprises a tapered portion formed at one or both ends thereof, and wherein each of the metallic sheaths comprises a correspondingly tapered cylindrical inner wall portion surrounding the tapered portion of the ceramic sleeve.

81. The extension portion of example 80, wherein the extension portion comprises the tapered portion at the end closer to the arcing tip, in which a width thereof decreases towards the arcing tip, wherein the tapered portion is configured such that tangents of an exterior surface of the extension portion form a triangle or a cone having an angle of apex that is less than 16 degrees.

82. The extension portion of example 81, wherein the extension portion has a shape, length and a lateral dimension such that the extension portion is configured to not contact a sidewall of a triangular groove having a depth exceeding 4 inches and having an angle of an apex that is less than 16 degrees while the tip of the consumable electrode contacts the apex.

83. The extension portion of example 76, wherein an inner cavity of the ceramic sleeve has one or both end portions that are flared to have a diameter greater than that of a middle portion of the inner cavity.

84. The extension portion of example 76, wherein an outer edge of one or both ends of the ceramic sleeve is rounded.

85. The extension portion of example 76, wherein the metallic sheath formed at an end closer to a stick-out portion of the consumable electrode has an outer edge that is rounded.

86. The extension portion of example 76, wherein the metallic sleeves are formed of a steel.

87. The extension portion of example 76, wherein the ceramic sleeve is formed of a material selected from the group consisting of silicon nitride, magnesia-stabilized zirconia, yttria-stabilized zirconia, silicon carbide, magnesium oxide, alumina or a zirconia-toughened alumina.

88. An electrode assembly for submerged arc welding (SAW), comprising:
   a head portion and an extension portion that are arranged serially to feed a consumable electrode therethrough such that, during SAW, the head portion is disposed to be distal to an arcing tip of the consumable electrode and the extension portion is disposed to be proximal to the arcing tip of the consumable electrode,
   wherein the head portion includes a contact tip configured to electrically contact the consumable electrode to deliver power thereto, and
   wherein the extension portion comprises:
      a ceramic sleeve configured to sliding feed the consumable electrode therethrough after passing through the contact tip; and
      a pair of metallic sheaths covering opposing ends of the ceramic sleeve.

89. The electrode assembly of example 88 wherein a gap between the ceramic sleeve and each of the metallic sheaths is filled with a sealant such that the ceramic sleeve and the metallic sheaths are immobilized with respect to each other.

90. The electrode assembly of example 88, wherein the extension portion is mechanically coupled to the contact tip through one of the metallic sheaths distal to the arcing tip relative to the contact tip.

91. The electrode assembly of example 88 wherein the ceramic sleeve comprises a single piece of a ceramic material selected from the group consisting of silicon nitride, magnesia-stabilized zirconia, yttria-stabilized zirconia, silicon carbide, magnesium oxide, alumina or a zirconia-toughened alumina.

Unless the context clearly requires otherwise, throughout the description and the claims, the words "comprise," "comprising," "include," "including" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number, respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or whether these features, elements and/or states are included or are to be performed in any particular embodiment.

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further embodiments. The various features and processes described above may be implemented independently of one another, or may be combined in various ways. All possible combinations and sub-combinations of features of this disclosure are intended to fall within the scope of this disclosure.

What is claimed is:

1. An electrode assembly for submerged arc welding (SAW), comprising:
    a head portion and an extension portion that are arranged serially to feed a consumable electrode therethrough such that, during SAW, the head portion is disposed to be distal to an arcing tip of the consumable electrode and the extension portion is disposed to be proximal to the arcing tip of the consumable electrode;
    an electrical contact portion; and
    an electrical insulating tube,
    wherein the head portion includes a main body portion and a contact nozzle disposed between the main body portion and the extension portion, wherein the contact nozzle includes a contact tip configured to electrically contact the consumable electrode to deliver power thereto, wherein the electrical contact portion is configured to receive the power from a power source and to deliver the power to the contact tip, wherein the extension portion is formed of a single piece insulating article configured for the consumable electrode to finally pass through after passing through the contact tip and before the arcing tip is exposed, and wherein the electrical insulating tube is configured to electrically insulate the consumable electrode from the main body portion, the electrical contact portion, and at least a portion of the contact nozzle.

2. The electrode assembly of claim 1, configured such that, during SAW with the consumable electrode inserted therethrough, a ratio between an electrical stick-out distance, measured between the contact tip disposed at an end of the head portion and the arcing tip of the consumable electrode, and a diameter of the consumable electrode exceeds 30.

3. The electrode assembly of claim 2, wherein the extension portion has a length of 80 mm or greater for the consumable electrode having a diameter of 3 mm or greater.

4. The electrode assembly of claim 1, wherein the contact tip is configured to electrically contact the consumable electrode to deliver power thereto.

5. The electrode assembly of claim 4, wherein the electrical contact portion is disposed between the main body portion and the contact nozzle, wherein the electrical contact portion is electrically connected to the contact nozzle.

6. The electrode assembly of claim 5, wherein the electrical insulating tube is configured to guide the consumable electrode.

7. The electrode assembly of claim 4 wherein the contact nozzle has a length greater than 140 mm.

8. The electrode assembly of claim 4, wherein: the contact nozzle has opposing first and second ends,
    the first end of the contact nozzle is coupled to the electrical contact portion,
    the contact tip is at the second end, and
    the electrical insulating tube extends through the first end to the second end.

9. The electrode assembly of claim 8, wherein the consumable electrode passes through the electrical insulating tube such that the electrical insulating tube is positioned between the consumable electrode and the main body portion, the electrical contact portion, and the portion of contact nozzle.

10. The electrode assembly of claim 9, wherein:
    the contact nozzle includes sidewalls that extend between the first end and the contact tip,
    the portion of the contact nozzle tip includes the sidewalls and the first end, and
    the contact tip directly contacts the consumable electrode.

11. An electrode assembly for submerged arc welding (SAW), comprising:
    a head portion including a main body portion and a contact nozzle disposed between the main body portion and the extension portion, wherein the contact nozzle includes a contact tip configured to electrically contact a consumable electrode to deliver power thereto;
    an extension portion arranged serially with the head portion in a wire feed direction, wherein the head portion and the extension portion are configured to feed a consumable electrode therethrough;
    an electrical contact portion; and
    an electrical insulating tube, wherein:
        the extension portion is configured to be disposed to be proximal to an arcing tip of the consumable electrode relative to the head portion,
        the extension portion is formed of a single piece insulating article arranged to be serial to the contact tip,
        the electrical contact portion is configured to receive the power from a power source and to deliver the power to the contact tip, and
        the electrical insulating tube is configured to electrically insulate the consumable electrode from the main body portion, the electrical contact portion, and at least a portion of the contact nozzle.

12. The electrode assembly of claim 11, wherein the extension portion comprises a single piece of insulating material.

13. The electrode assembly of claim 11, wherein the extension portion has a length greater than 80 mm.

14. The electrode assembly of claim 11, wherein the extension portion has a shape, a length, and a width such that the extension portion is configured to not contact a sidewall of a triangular groove having a depth exceeding 4 inches and having an angle of an apex, that is less than 16 degrees while the tip of the consumable electrode contacts the apex.

15. The electrode assembly of claim 11, wherein the extension portion is formed of a ceramic material and is configured to surround the consumable electrode.

16. The electrode assembly of claim 11 wherein the extension portion has a length greater than 120 mm.

17. The electrode assembly of claim 11 wherein:

the extension portion comprises opposing first and second end portions, the first end portion is configured to be positioned proximal to the head portion and has a first width, the second end portion is configured to be positioned distal to the head portion and has a second width, and the second width is less than the first width.

18. The electrode assembly of claim 17 wherein the first width is 18 mm and the second width is 14 mm.

19. The electrode assembly of claim 17, wherein the extension portion comprises a tapered portion in which a width thereof decreases towards the arcing tip, wherein the tapered portion is configured such that tangents of an exterior surface of the extension portion form a triangle or a cone having an angle of apex that is less than 16 degrees.

20. The electrode assembly of claim 19, wherein the extension portion has a shape, length and a lateral dimension such that the extension portion is configured to not contact a sidewall of a triangular groove having a depth exceeding 4 inches and having an angle of an apex that is less than 16 degrees while the tip of the consumable electrode contacts the apex.

21. The electrode assembly of claim 17, wherein the first end portion comprises threading configured to releasably couple with threading on the head portion.

* * * * *